US012315347B2

(12) United States Patent
Hamman et al.

(10) Patent No.: US 12,315,347 B2
(45) Date of Patent: May 27, 2025

(54) METHOD AND SYSTEM FOR PRODUCING N-TUPLE NUMBER SETS FOR LOTTERY SUBMISSIONS

(71) Applicant: SCA PROMOTIONS, Dallas, TX (US)

(72) Inventors: Robert Hamman, Dallas, TX (US); Jay B Ross, Delran, NJ (US)

(73) Assignee: SCA PROMOTIONS, Dallas, TX (US)

( * ) Notice: Subject to any disclaimer, the term of this patent is extended or adjusted under 35 U.S.C. 154(b) by 0 days.

(21) Appl. No.: 18/197,955

(22) Filed: May 16, 2023

(65) Prior Publication Data

US 2024/0169807 A1 May 23, 2024

Related U.S. Application Data

(60) Provisional application No. 63/475,599, filed on Nov. 18, 2022.

(51) Int. Cl.
*G07F 17/32* (2006.01)

(52) U.S. Cl.
CPC ........ *G07F 17/329* (2013.01); *G07F 17/3237* (2013.01)

(58) Field of Classification Search
CPC .. A63F 3/0605; G07F 17/3241; G07F 17/329; G07F 17/3237
See application file for complete search history.

(56) References Cited

U.S. PATENT DOCUMENTS

| | | | | |
|---|---|---|---|---|
| 11,694,520 | B2 * | 7/2023 | Clemenson | G07F 17/3251 463/17 |
| 2009/0194988 | A1 * | 8/2009 | Wright | G07F 17/32 283/94 |
| 2013/0012286 | A1 * | 1/2013 | Schuff | A63F 3/0645 463/25 |
| 2013/0072280 | A1 * | 3/2013 | Yacenda | H04W 4/021 463/17 |
| 2022/0309862 | A1 * | 9/2022 | Gotlieb | G07F 17/326 |

* cited by examiner

*Primary Examiner* — Robert E Mosser
(74) *Attorney, Agent, or Firm* — MEAGHER EMANUEL LAKS GOLDBERG & LIAO, LLP

(57) ABSTRACT

A method and system which facilitate generation and submission of one or more lottery number entry combinations. The system consists of a smart device operated by a lottery player whereby, the smart device is downloaded with a lottery number generation application and the application is used by the lottery player to communicate via an internet connection to a central system. The central system incorporates a database and database management utility. The central system processes requests from the lottery player to establish a system account, manage monetary funds, and process lottery player's N-tuple number set submissions. The central system will also notify the lottery player by way of the player's email address, text message, or through the application of the final outcome of a lottery drawing previously selected by the lottery player if any number entry submission for the lottery drawing resulted in full or partial winning results.

1 Claim, 26 Drawing Sheets

| Match | Prize | Odds 1 in |
|---|---|---|
| | | |
| 5 + Powerball | Jackpot | 292,201,338 |
| 5 | $1,000,000 | 11,688,054 |
| 4 + Powerball | $50,000 | 913,129 |
| 4 | $100 | 36,525 |
| 3 + Powerball | $100 | 14,494 |
| 3 | $7 | 580 |
| 2 + Powerball | $7 | 701 |
| 1 + Powerball | $4 | 92 |
| 0 + Powerball | $4 | 38 |

Figure 24

| | | | | | | | | | |
|---|---|---|---|---|---|---|---|---|---|
| 71 | 73 | 79 | 83 | 89 | 97 | 101 | 103 | 107 | 109 |
| 113 | 127 | 131 | 137 | 139 | 149 | 151 | 157 | 163 | 167 |
| 173 | 179 | 181 | 191 | 193 | 197 | 199 | 211 | 223 | 227 |
| 229 | 233 | 239 | 241 | 251 | 257 | 263 | 269 | 271 | 277 |
| 281 | 283 | 293 | 307 | 311 | 313 | 317 | 331 | 337 | 347 |
| 349 | 353 | 359 | 367 | 373 | 379 | 383 | 389 | 397 | 401 |
| 409 | 419 | 421 | 431 | 433 | 439 | 443 | 449 | 457 | 461 |
| 463 | 467 | 479 | 487 | 491 | 499 | 503 | 509 | 521 | 523 |
| 541 | 547 | 557 | 563 | 569 | 571 | 577 | 587 | 593 | 599 |
| 601 | 607 | 613 | 617 | 619 | 631 | 641 | 643 | 647 | 653 |
| 659 | 661 | 673 | 677 | 683 | 691 | 701 | 709 | 719 | 727 |
| 733 | 739 | 743 | 751 | 757 | 761 | 469 | 773 | 787 | 797 |
| 809 | 811 | 821 | 823 | 827 | 829 | 839 | 853 | 857 | 859 |
| 863 | 877 | 881 | 883 | 887 | 907 | 911 | 919 | 929 | 937 |
| 941 | 947 | 953 | 967 | 971 | 977 | 983 | 991 | 997 | |

Figure 25

METHOD AND SYSTEM FOR PRODUCING N-TUPLE NUMBER SETS FOR LOTTERY SUBMISSIONS

CROSS-REFERENCE TO RELATED APPLICATION

This application claims the priority and all benefits of U.S. Provisional Application No. 63/475,599 filed on Nov. 18, 2022, the content of which is hereby incorporated by reference in its entirety.

TECHNICAL FIELD

Present embodiments relate to one or more individual lottery player's participation in public lotteries and the system and methods used to support the player's participation. The public lottery games Mega Millions and Powerball represent nonlimiting examples of a public lottery. The invention consists of a method and system whereby, each lottery player's smart device generates or requests the generation of one or more N-tuple subsets using a deterministic method and at least one randomized resource to generate the player's one or more lottery entries and submits them to an online system on behalf of a lottery player. The online system records the player's selections and registers them as lottery entries on behalf of the player with the public lottery system, for participation in a specific identified public lottery drawing.

BACKGROUND

The first recorded lottery occurred during the Chinese Han Dynasty between 205 A.D. and 187 B.C. A lottery is a form of gambling that involves the drawing of random whole numbers (integer) in a specific range and requires 1 or more participants to select in advance their guess of a random outcome to win at least one prize if the guess matches the drawing outcome. Lottery games consist of a finite group of numbers that exist within a predefined range that will be randomly selected to produce a subset of numbers found within the predefined range.

An important idea of a lottery game is for a lottery contestant to guess in advance what the subset of numbers will be. To ensure there are a sufficient quantity of number subsets, the number range must be large enough to produce a sufficient quantity of number combinations. By example, the Mega Millions Lottery (a very popular lottery game) has a number range of 1 to 70, with 5 of the 70 numbers randomly selected as a subset drawing. An additional bonus number is drawn separately with a range of 1 to 25, and is appended to the 5 number subset. This configuration results in the odds of winning the grand prize to be 302,575,350 to 1, which also represents the total 5 number combinations configured with a bonus number. To assist the contestant in picking numbers, the lottery system offers a courtesy feature where a contestant can request, with their paid entry, the lottery system to randomly generate 6 random number picks (5 subset, 1 bonus) and submit them automatically as the contestant's entry. This process of producing machine generated "guesses" that will be automatically submitted as a contestant game entry is referred to as a "quick pick".

SUMMARY

It is an object of the invention to provide a method and system to participate in a publicly available lottery drawing without having to physically go to a lottery retailer. The lottery player's smart device is used to create or request one or more lottery number combination entries that will be automatically submitted as an entry "ticket" with the public lottery system.

The present invention comprises a novel method and system that allows a lottery player to use their smart device to purchase one or more N-tuple number set lottery entry tickets, circumventing the need to visit a lottery ticket retailer to purchase lottery tickets. The system will automatically generate one or more N-tuple number selections, where each N-tuple number set represents a lottery ticket entry. The method used to produce the N-tuple lottery ticket values incorporate the use of the lottery player's personal phone number, an entropy source for a random number selection, a one-way hash function, and a finite near prime number set.

BRIEF DESCRIPTION OF THE DRAWINGS

Some embodiments of the present invention are illustrated as an example and are not limited by the figures of the accompanying drawings:

FIG. 24 is a table of prizes and odds for the Powerball lottery game;

FIG. 25 is a table of all the prime numbers between 70 and 1,000; and

FIG. 1 is a graphical block diagram of an existing lottery system which currently supports a lottery draw type number game. The Lottery Office 2 is the central point of the system for creating, implementing, managing, promoting, and officiating the results of the game.

The method and process of creating a lottery draw type number game begins with the creation of the game specifications 1. The specification can be developed at a secure site external to the main lottery office 2. Communication of the game specifications may occur using a secure internet connection 4 to the main lottery office 2. The Game File Specification 1 will indicate the type of draw game, the odds of winning the draw game, the cost associated with purchasing a ticket, the frequency of the draw game and how to win the game.

The Lottery Office 2 authorizes various retail establishments 5 6 7 to sell lottery tickets to participants. The participants may be allowed to "pick" their own numbers to use on their ticket or they may be allowed to utilize a random number generator (not shown) to select a "quick pick", where the random number generator selects the numbers to be used on the participants ticket. The retail establishments 5 6 7 communicate with the Lottery Office 2 via Secure Network 4 to inform the Lottery Office 2 of the purchased tickets details such as but not limited to date and time of sale, numbers selected, date and time of drawing the ticket is valid and vendor id.

Figure 1:
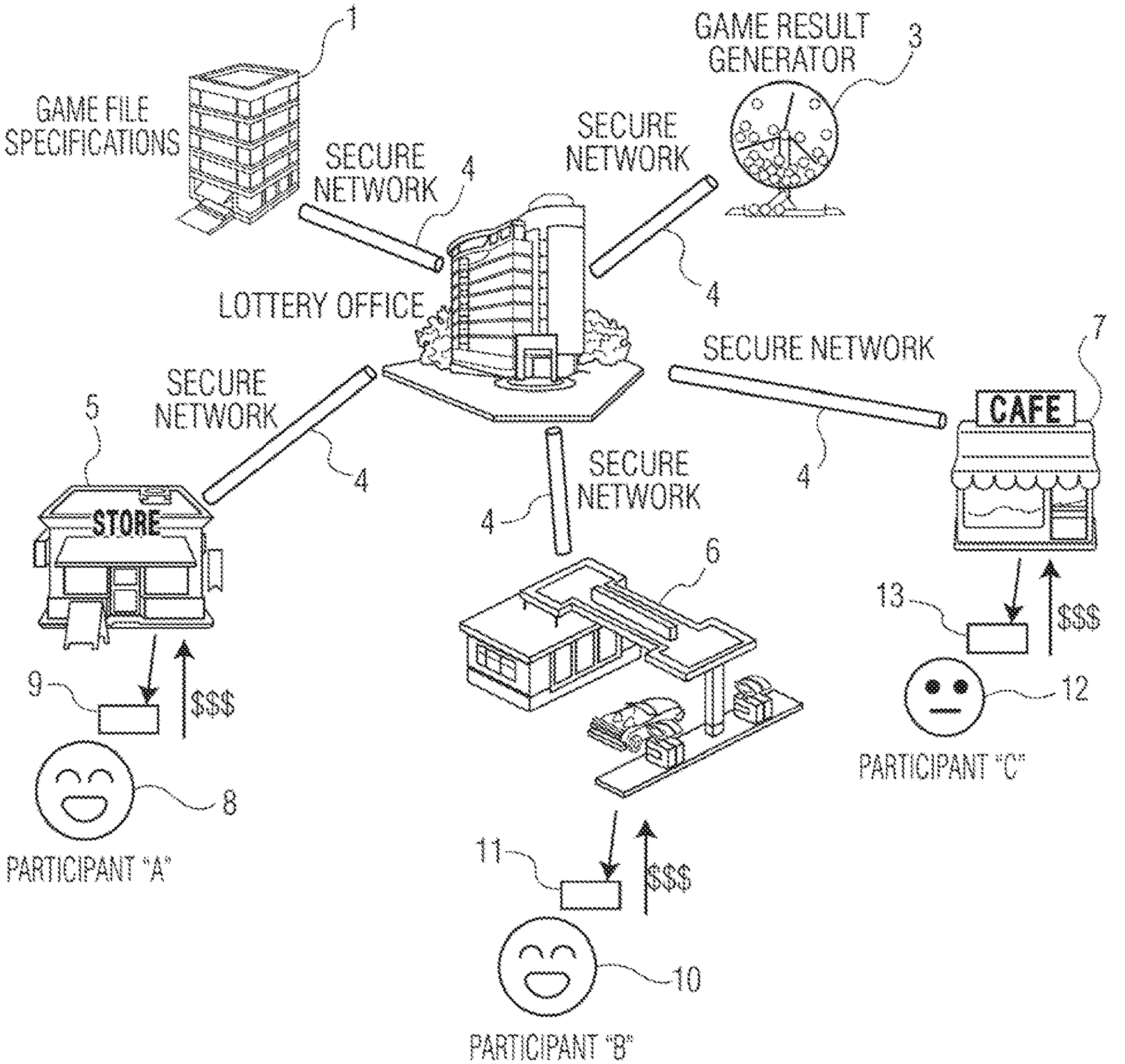
FIG. 1 PRIOR ART
FIG. 1 is a prior art system block diagram.

FIG. 1 additionally shows (in abstract form) three game participants interacting with the lottery system via the authorized retail establishments. Participant "A" 8 has purchased a lottery ticket 9 from an authorized lottery reseller 5. The authorized lottery reseller 5 communications with the main lottery office 2 through a secure connection 4. Participant "B" 10 has purchased a lottery ticket 11 from an authorized lottery reseller 6. Participant "C" 12 has purchased a lottery ticket 13 from an authorized lottery reseller 7.

When Participant 8 10 12 initiate the purchase of lottery tickets 9 11 13, reseller 5 6 7 communicate with the Lottery Office 2. Based on the number of games, either manually chosen numbers or quick picks, purchased from participants 8 10 12, reseller 5 6 7 print a ticket 9 11 13 containing the number combination for each game purchased.

Draw type Lottery Tickets 9 11 13 are valid for one number drawing which will take place at a specified date and time using the game result generator 3. As a nonlimiting example, the game result generator 3 can be a gravity pick or air mix mechanical machine or a computerized random number generator. The Game Result Generator 3 may or may not be located at a site external to the Lottery Office 2.

At a specified date and time, the game drawing occurs, and the results may be transmitted via secure network connection 4 to the main lottery office 2. The game drawing is typically broadcast on live television and the results are published by the Lottery Office 2 in print media and on digital media.

Participant 8 10 12 compare the number combinations on their Lottery Tickets 9 11 13 to the number combination generated by the Game Result Generator 3 by either watching the live drawing on TV, reviewing the results published in the local newspaper or on the website of the Lottery Office 2.

After checking the Lottery Ticket 9 11 13 results, Participant "A" 8 and Participant "B" 10 have discovered at least one of their number combinations matches the Game Result perfectly and are a grand prize winner. As both participants 8 10 have the grand prize winning combinations, they must split the grand prize between each other and with any other participants (not shown) which have a ticket containing the grand prize winning combination. Participant "C" 12 may or may not have had one or more secondary winning combinations on their respective Lottery ticket 13.

DETAILED DESCRIPTION

Figure 2:
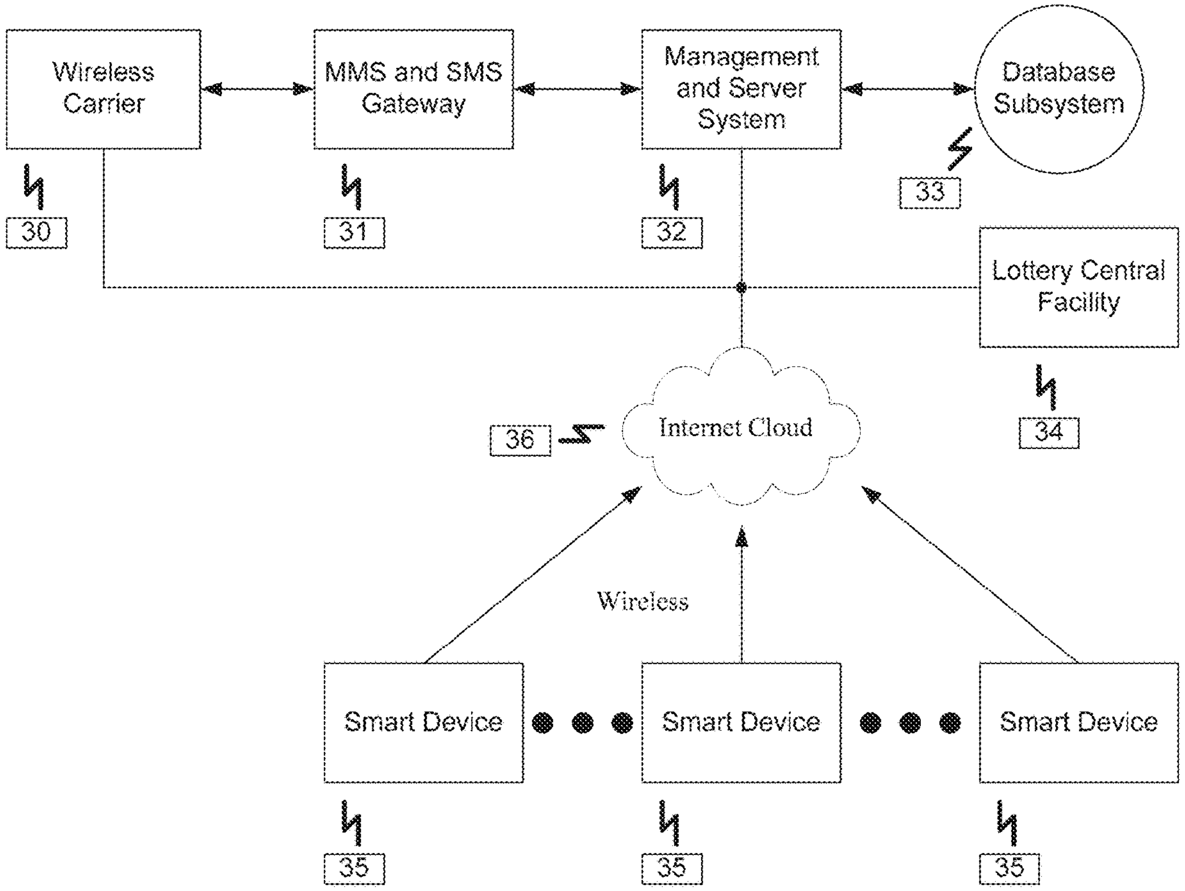
FIG. 2 is an overall system diagram.

FIG. 2 represents a simplified diagram of the N-tuple Lottery Number Generation System. The wireless carrier 30 is a company that offers wireless data communication services to subscribers. The Multimedia Messaging Service (MMS) and Short Message Service (SMS) Gateway 31 allows the Lottery Central Facility 34 to send messages to the lottery participants smart devices 35. The Lottery Central Facility utilizes the Management and Server System 32 and Database Subsystem 33 to identify the type and content of the messages to deliver to the Smart Device 35. The subsections of the Overall System communicate with each other through the Internet Cloud 36.

Figure 3:
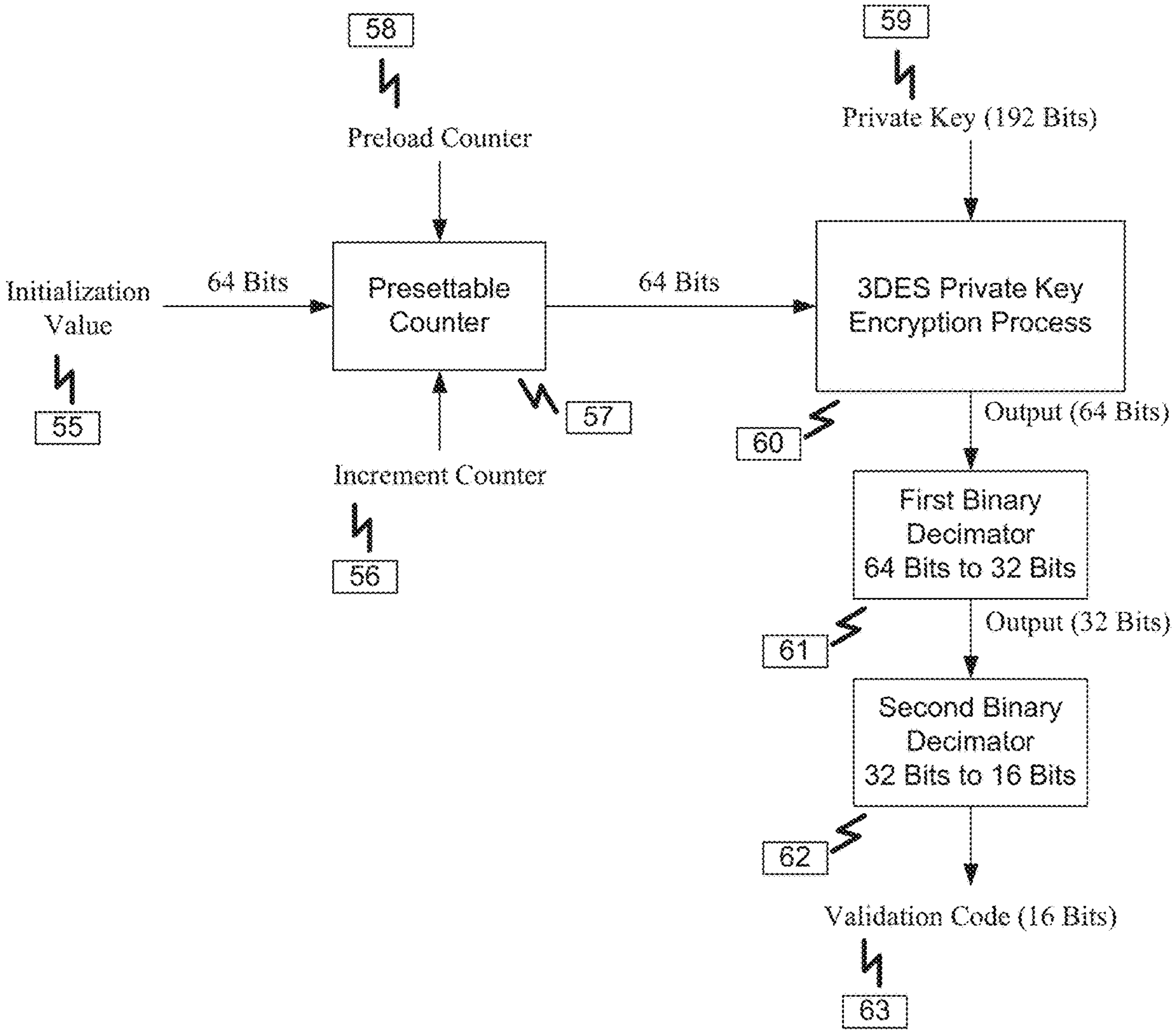
FIG. 3 is a secure authentication code generator diagram.

FIG. 3 represents a simplified block diagram of an exemplary Secure Authentication Code Generator which is used to generate the 2-factor authentication code used during the player log in process. The first element of the Code Generator is a 64 bit Presettable Counter 57. The Presettable Counter 57 has 3 inputs; the initialization value 55 which represents the number the presettable counter 57 begins at, a preload counter 58 signal which represents a clocking signal to load the initialization value into the presettable counter 57 and the Increment Counter 56 clocking signal which increments the presettable counter 57 to the next value. The output of the presettable counter 57 is input into a 3DES Private Key Encryption Process 60.

The 3DES Encryption Process 60 utilizes a 192 bit Private Key 59 to encrypt the 64 bit output from the presettable counter 57. Once the encryption process is complete, the encrypted data is sent to a First Binary Decimator 64 bit to 32 bit 61. The first binary decimator 61 converts the 64 bits of encrypted data into 32 bits of data and outputs the data to the Second Binary Decimator 32 bits to 16 bits 62. The second binary decimator 62 converts the 32 bits of encrypted data to 16 bits of encrypted data which is used as the 16 bit Validation Code 63.

Figure 4:
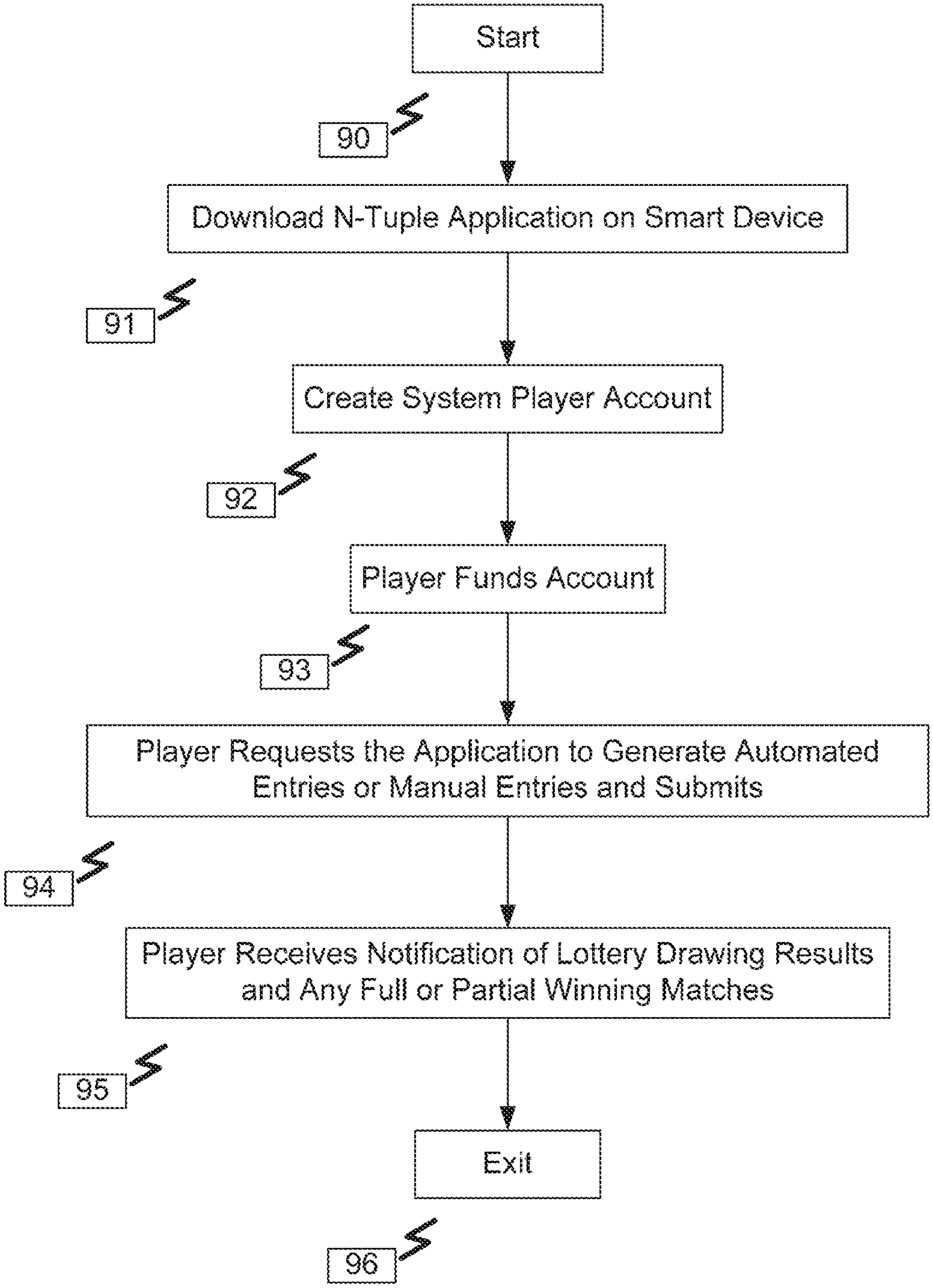
FIG. 4 is a flowchart for player interaction with the system.

FIG. 4 is a flowchart depicting the flow process for player interaction with the Prime Lottery Number Generation System. The process starts at block 90. Using a smart device, the player accesses an "application download center" to download the N-tuple number set Application to their smart device 91. As this is a new installation, the player will create a system account 92. Once the account is created, the player will add funds to their account 93 which will allow the player to utilize the system. The player will submit a lottery entry by either requesting the system to generate an automated entry or by creating a manual entry 94. Once the lottery drawing has occurred, the player will receive notification of the drawing results and of any full or partial winning matches 95. The process exits at 96.

Figure 5:
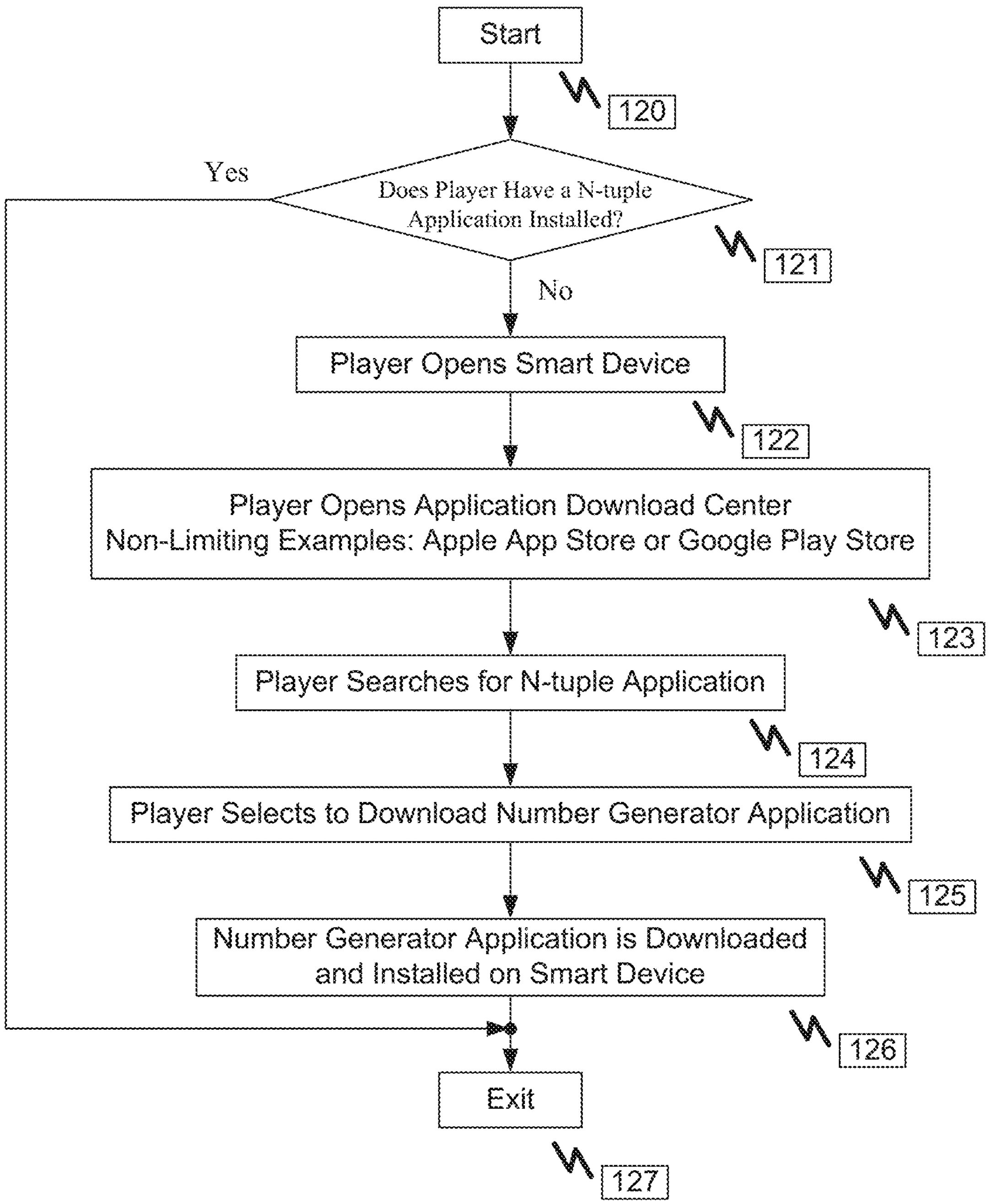
FIG. 5 is a system flowchart for the number group generator.

FIG. 5 represents the flow process for the player to download the N-tuple number set Application. The process begins 120 by checking if the player has already downloaded and installed the N-tuple number set Application 121. If the app is already installed on the smart device the flow exits 127. Otherwise, the player opens their smart device 122 and then opens the application download center 123. Utilizing the search feature in the application download center, the player searches for the N-tuple number set Application 124. The player selects to download or install the N-tuple number set Application 125. The application download center downloads the application install file onto the smart device and then automatically installs the application for the player to use 126. Once installation is successfully completed, the process exits 127.

Figure 6:
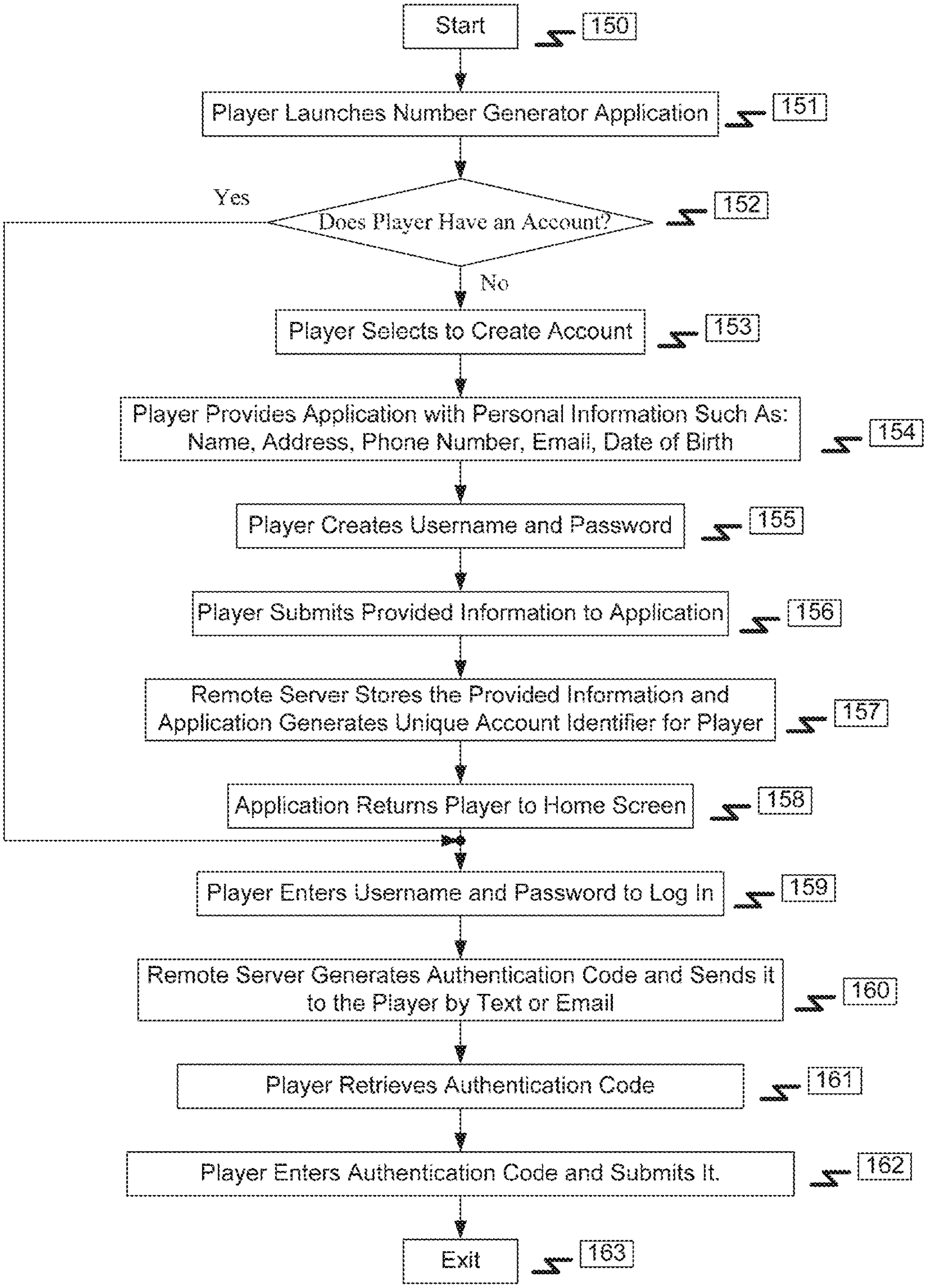
FIG. 6 is a system flowchart of the player account generation.

FIG. 6 is the flow process diagram for player account generation. After the N-tuple number set Application is successfully installed on the smart device, the player opens or "launches" the app 151. The app will check to see if the player has already created an account 152. If yes, the app will prompt the player to enter their username and password 159. If the player does not have an account, the player will select to create the account 153. The app will prompt the player to input personal information required for account creation 154. Some nonlimiting examples of personal information may include the player's name, address, phone number, email, and date of birth. The player will also create a unique username and password to be associated with the player's account 155. Once all information is entered on the smart device, the player will submit the information 156. The application will transmit the information via the internet cloud to the Remote Server and the app generates a unique account identifier for the player 157.

After successfully submitting the information, the app returns the player to the home screen 158. The app will prompt the player to enter their username and password 159. The app validates the information with the remote server (not shown). If the information is validated, the remote server will generate an authentication code and will transmit this code to the player either via SMS/MMS Gateway or email 160. The player will retrieve the verification code 161 and enter the code into the app to complete the verification and account setup process 162. The process exits 163.

Figure 7:
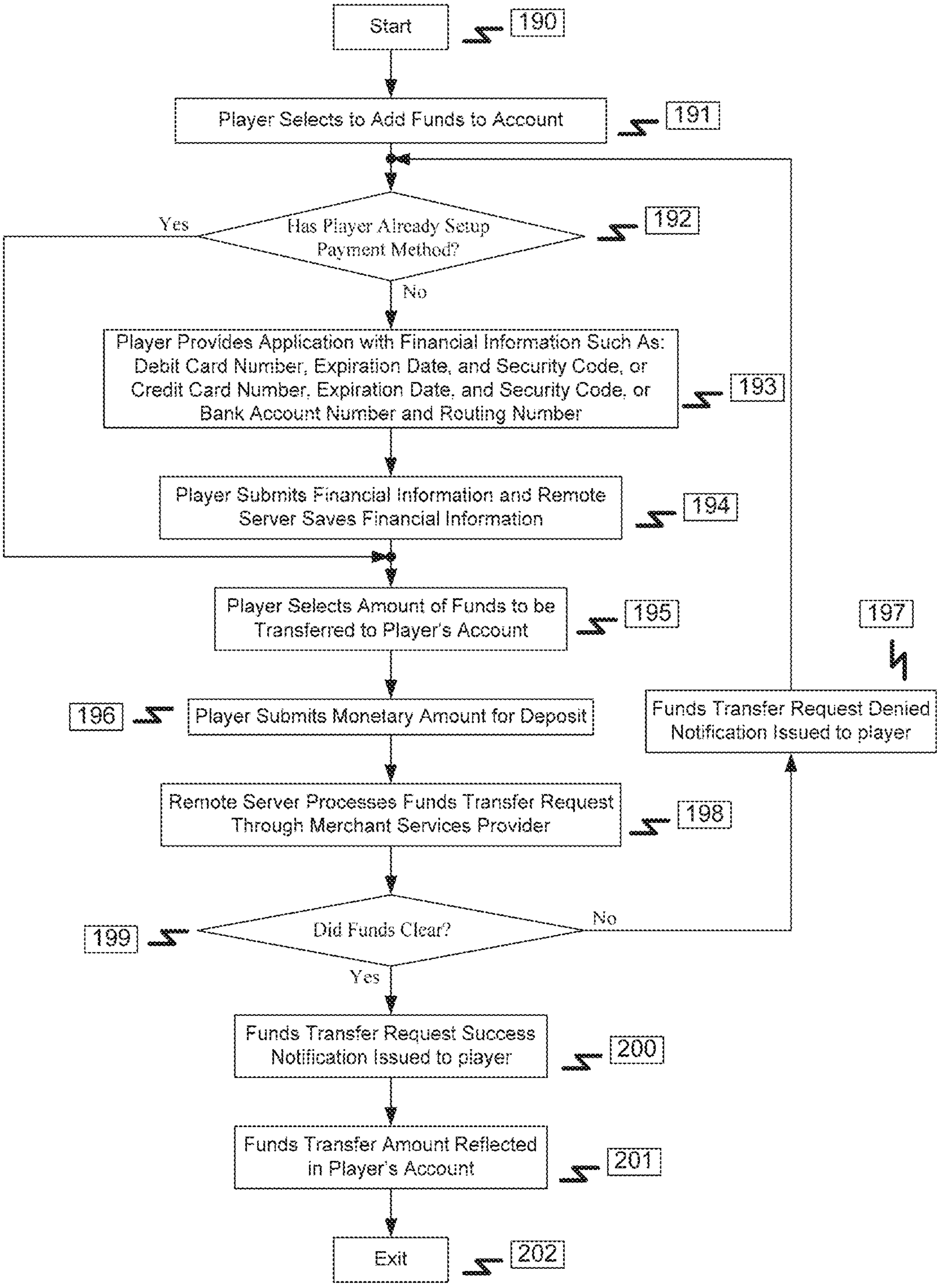
FIG. 7 is a system flowchart for the player funding of an account.

FIG. 7 represents the process flow for the player to fund their N-tuple number set App account. The process starts 190 with the player selecting to add funds to their account 191. The app will check if the player has already setup a payment method 192. If the player has already setup the payment method, the app will prompt the user to enter the amount of funds to add to their account 195. If they player hasn't setup their preferred payment method, the app will prompt the player to provide financial information such as but not limited to debit/credit card number, expiration date and security code or bank account number and routing number 193. Once the information has been entered, the player will submit, and the app will securely transmit the information to the remote server which will save the players financial information 194. Once the preferred payment method has been saved, the app will prompt the player to select the amount of funds to add to their account 195. Once entered, the player submits the information 196 and the remote server processes the funds transfer request through the merchant services provider 198. If the transfer request fails, the app will notify the player of the denied transaction 197 and will return to the step which allows the player to enter a different payment method 192. If the transfer is successful, the app notifies the player of the success 200 and updates the player account to reflect the newly added funds 201. The process then exits 202.

Figure 8:
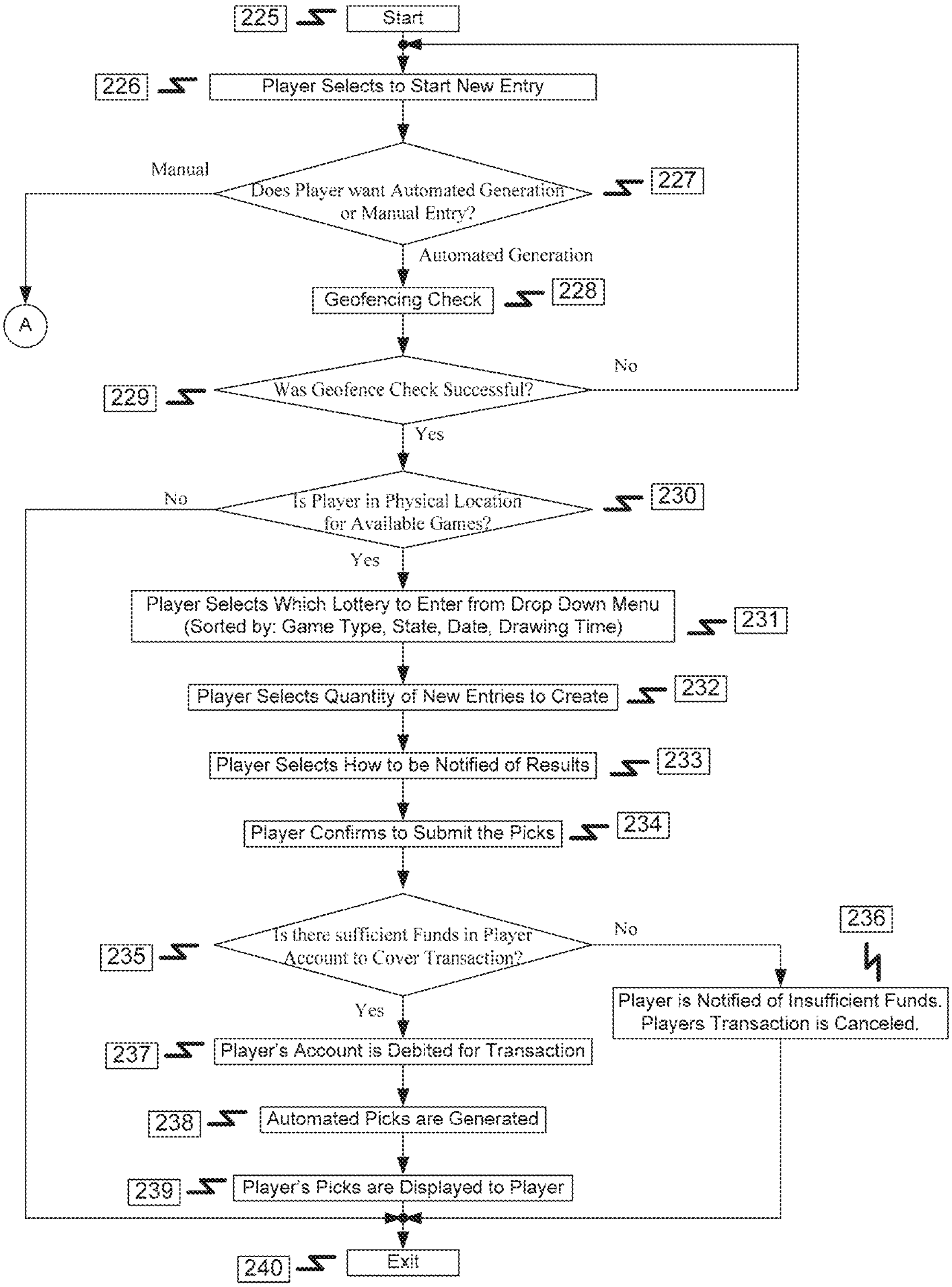
FIG. 8 is a system flowchart of the player automated entry selection.

FIG. 8 represents the flow process for a player to generate an automated entry selection. The process starts at 255 with the player selecting to start a new entry 226. The app will ask if the player wishes to generate an automated or manual entry 227. If the player chooses automated, the N-tuple number set App performs a geofencing check 228. If the geofence check was not successful 229, the app will display an error message (not shown) to the player and will continue to perform a geofence check 228 until the smart device is located within an acceptable area. Once the geofence check is successful 229, the app will determine if the player is in a physical location for available games 230. If they are not in a physical location, the app will exit 240. If the player is in a physical location, the app will allow the player to select which lottery to enter from a drop down menu 231.

The player will select the quantity of new entries for the selected lottery game to create 232, and how the player wishes to be notified of the lottery results 233. The app will display the selections (not shown) and the player confirms to submit the picks 234. The app verifies there is sufficient funds in the players account 235. If not, the app notifies the player of insufficient funds, cancels the transaction 236 and exits 240. Otherwise, the funds in the player's account are debited for the transaction 237 and the players automated picks are generated 238 and displayed to the player 239 on their smart device before exiting the process 240.

Figure 9:
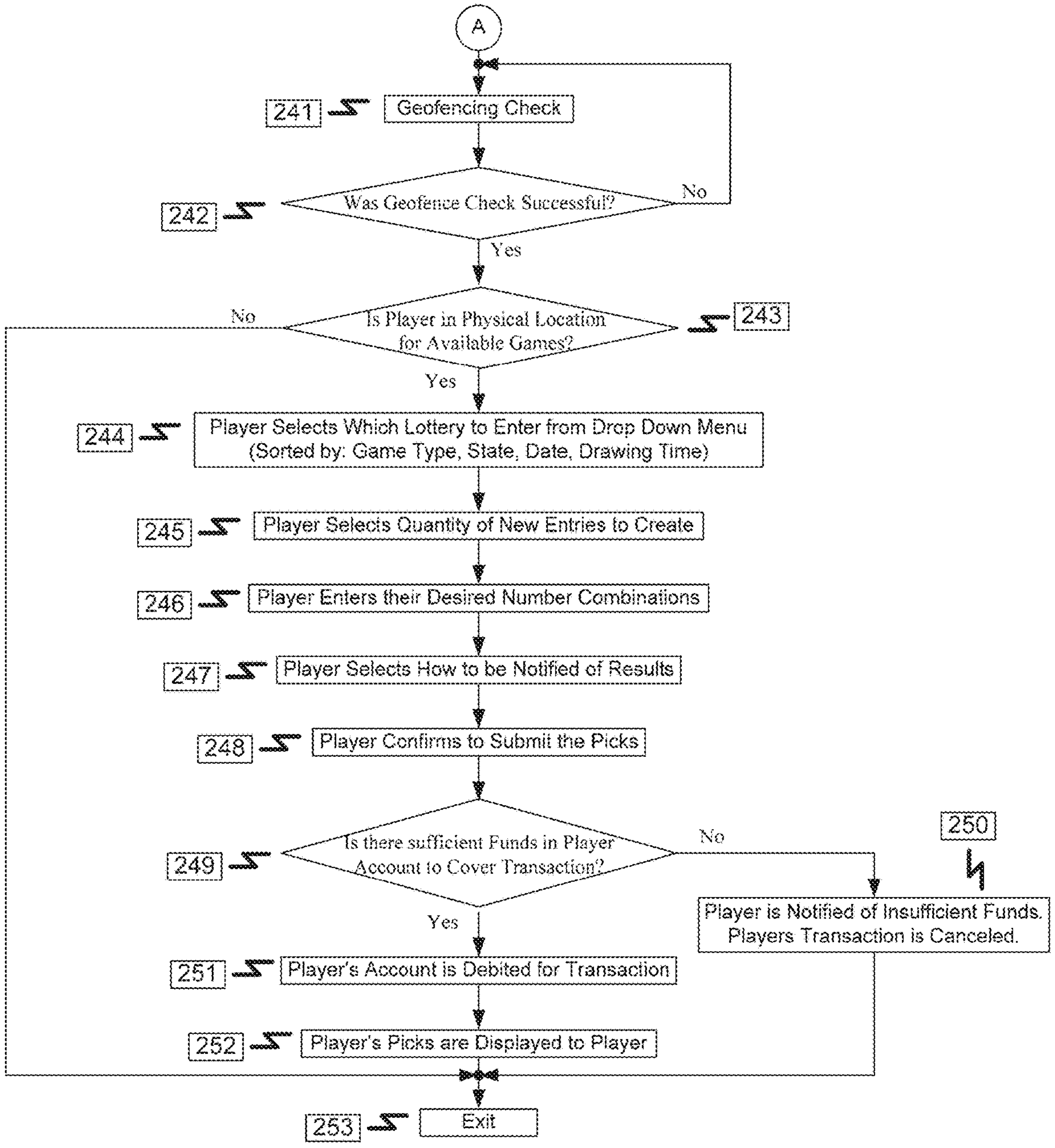
FIG. 9 is a system flowchart of the player manual entry selection.

FIG. 9 represents the flow process for a player to create a manual entry selection. The process starts with the N-tuple number set App performing a geofencing check 241. If the geofence check was not successful, the app will display an error message (not shown) to the player and will continue to perform a geofence check 241 until the smart device is located within an acceptable area. Once the geofence check is successful 242, the app will determine if the player is in a physical location for available games 243. If they are not in a physical location, the app will exit 253. If the player is in a physical location, the app will allow the player to select which lottery to enter from a drop down menu 244.

The player will select the quantity of new entries for the selected lottery game to create 245, the desired number combinations 246, and how the player wishes to be notified of the lottery results 247. The player submits the information for the "picks" 248. The app verifies there are sufficient funds in the players account 249. If not, the app notifies the player of insufficient funds, cancels the transaction 250 and exits 253. Otherwise, the funds in the player's account are debited for the transaction 251 and the players picks are displayed to the player 252 before exiting the process 253.

Figure 10:
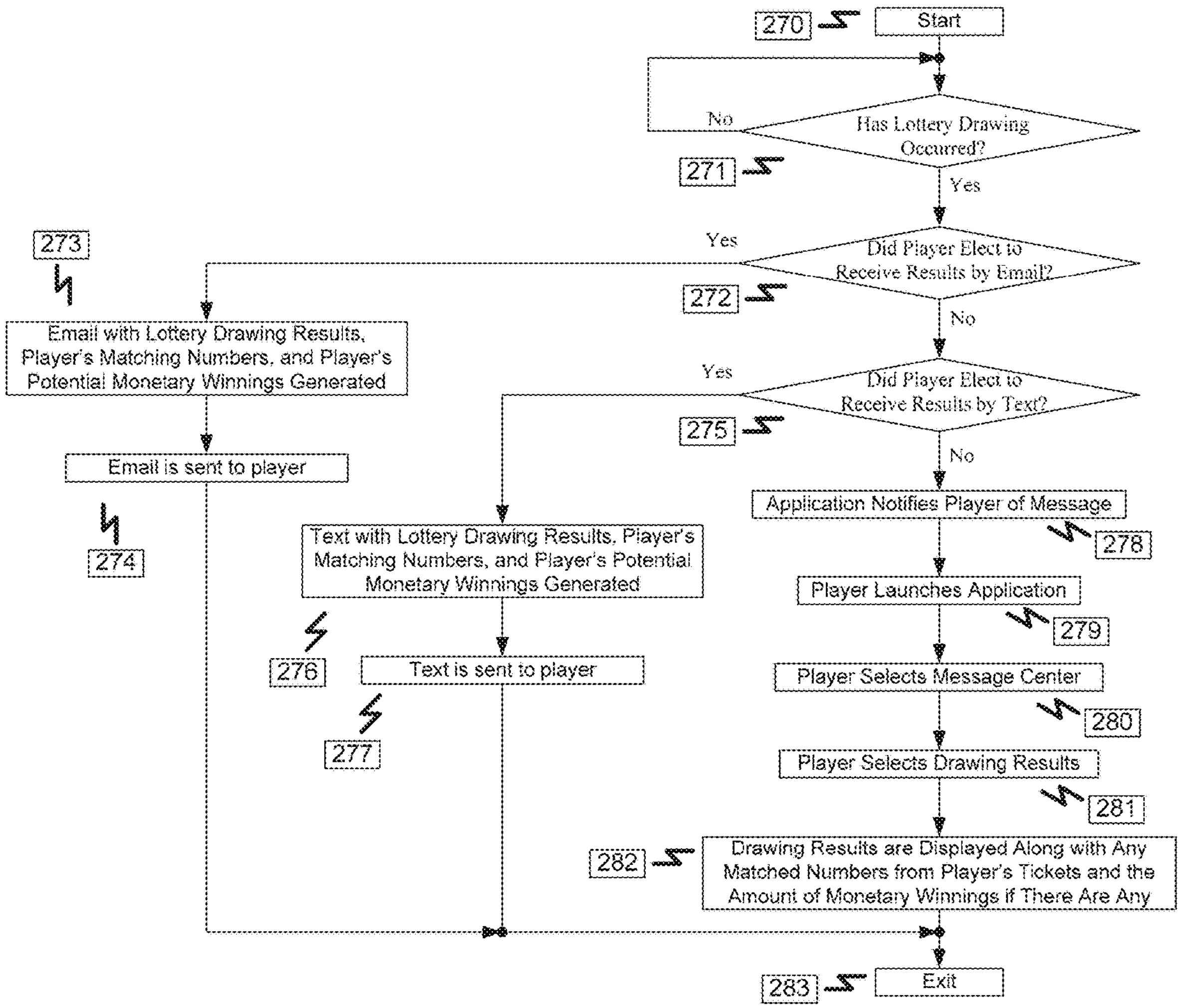
FIG. 10 is a system flowchart for the notification of lottery drawing results.

FIG. 10 is a flowchart showing the process flow for notifying a player on the lottery results. The process starts at 270. After the lottery results are tabulated, the process of notifying a player will proceed based on the player's preference for notification 271. The first check is to see if the player has previously requested notification by email 272. If email was not the player's preference, a check is made to determine if text was the players preference 275. If not, the application running on the players smart device notifies the player with a sound or screen message that the lottery results are available 278.

The player must activate (launch) the application on the smart device to obtain the notification 279. To view the message, the player selects the message center while the application is active 280. While in the message center, the player selects on the message identified as "drawing results" 281. The drawing results are displayed on the player's smart device screen, which will include the player's winnings, if any 282. The notification process is complete at 283.

In the event the player did request to be notified by email 272, an email is generated 273 and then sent to the email address previously established by the player 274. The process is not complete at 283.

In the event the player did request to be notified by text 275, a text message is generated 276 and then sent to the mobile phone number previously established by the player 277. The process is not complete at 283.

Figure 11:
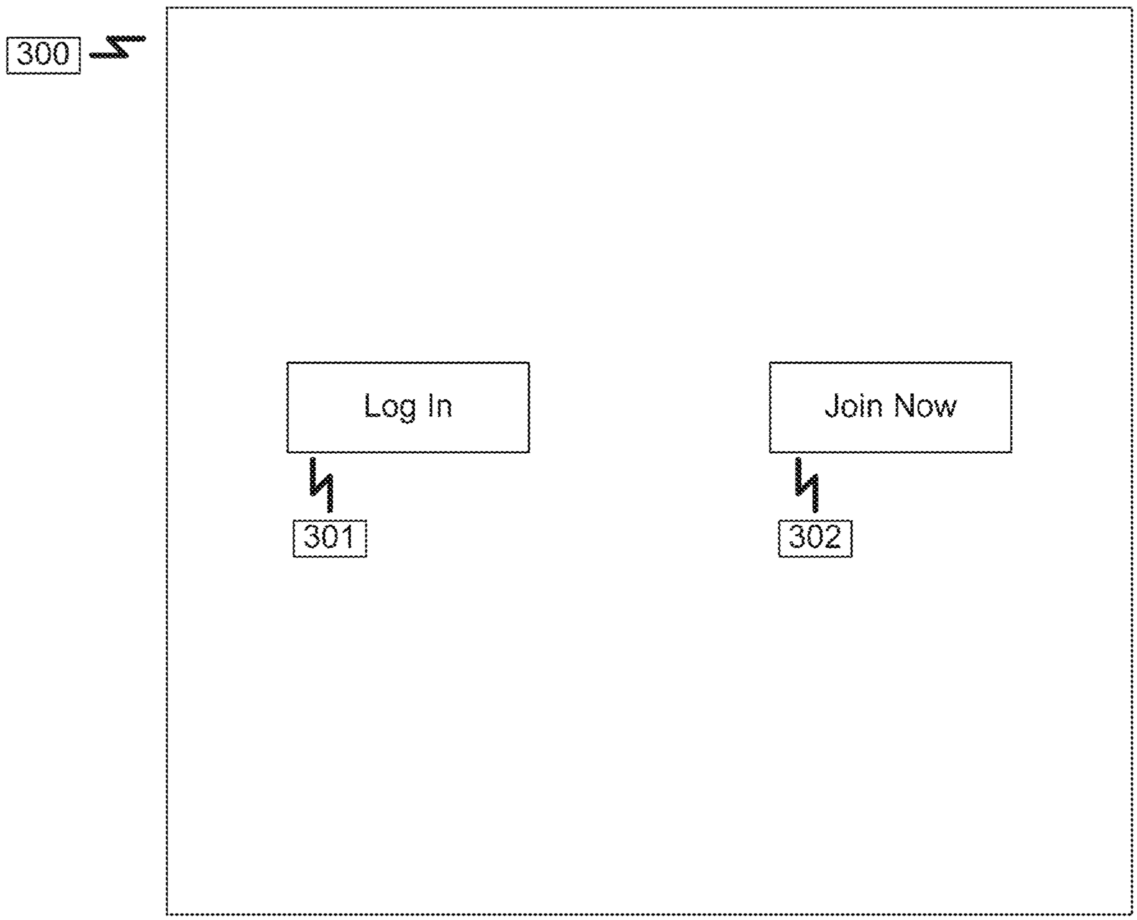
FIG. 11 is a diagram of the smart device application launch screen.

FIG. 11 is the Launch screen which provided to the user on their smart device screen 300. The player is given the option to Log In 301 if they have previously registered an account or to Join Now 302 if they need to create a new account. If Log In 301 was selected, then the process proceeds to FIG. 13. If Join Now 302 was selected, the process proceeds to FIG. 12.

Figure 12:
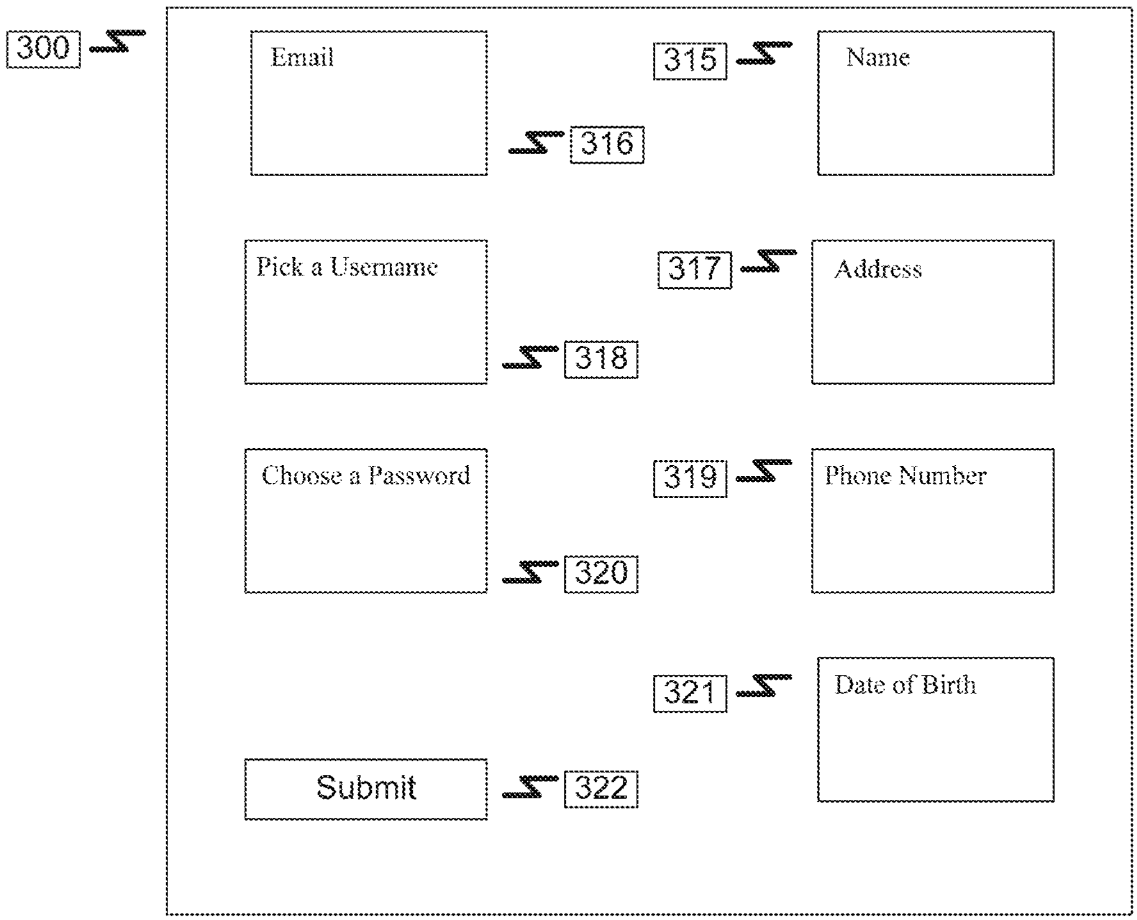
FIG. 12 is a diagram of the smart device account creation screen.

FIG. 12 shows the Account Creation screen on the user's smart device screen 300. The player will be asked to fill in their personal information, such as their email 316, name 315, address 317, phone number 319, and date of birth 321. The user will also be required to pick a username 318 and create a password 320. Once all this information is filled out by the player, the player will submit it by using the submit button 322.

Figure 13:
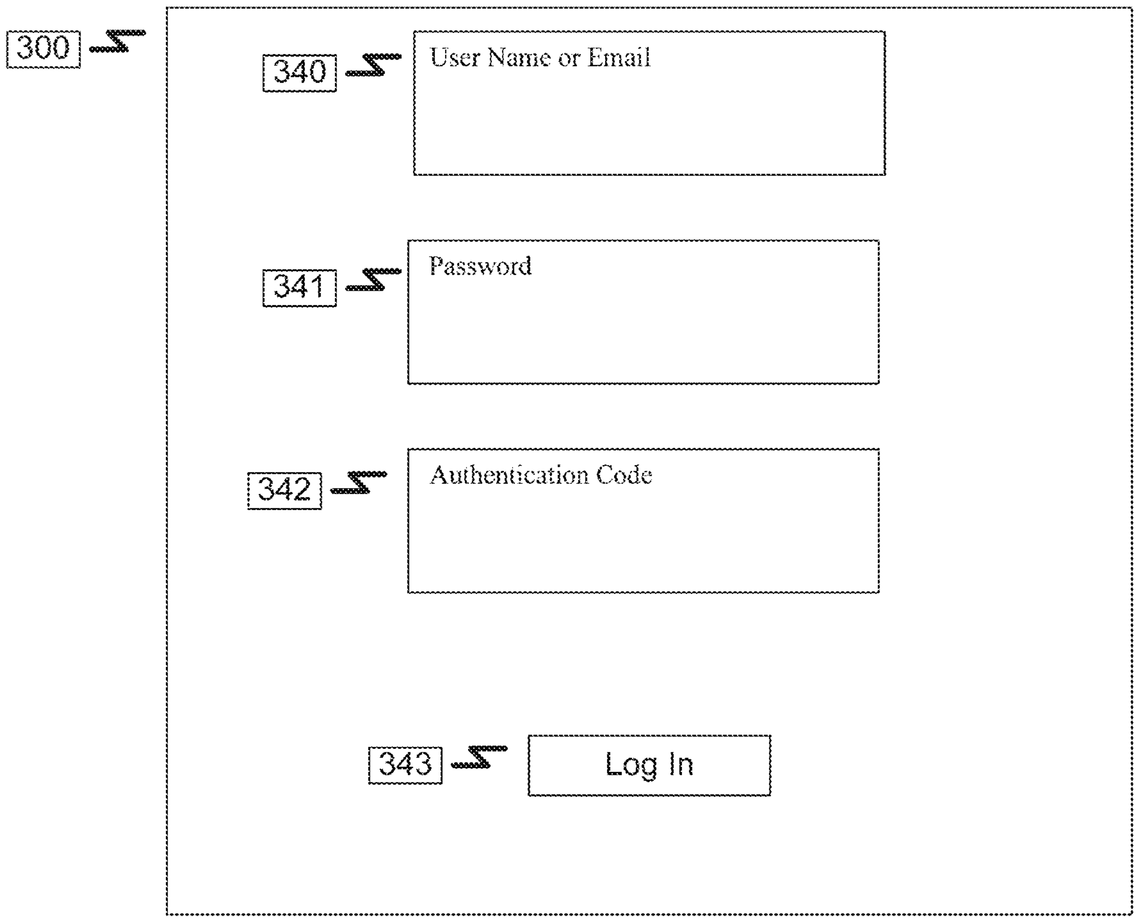
FIG. 13 is a diagram of the smart device application log in screen.

FIG. 13 shows the Log In screen. The user will be asked to enter their username or email 340 and password 341. The application will use a two-factor authentication process and will be sent an authentication code. The player will enter their authentication code 342 and then use the Log In button 343 to submit their inputted information.

Figure 14:
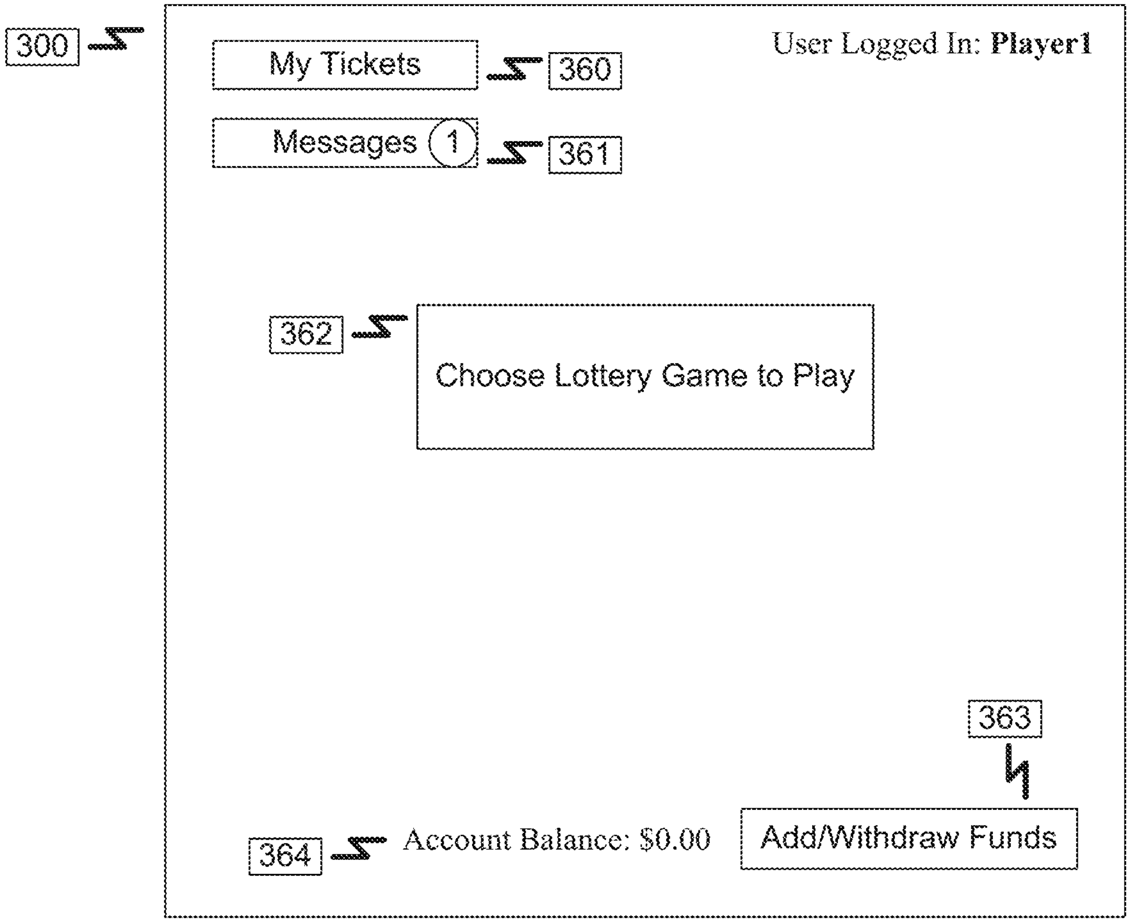
FIG. 14 is a diagram of the smart device application home screen.

FIG. 14 shows the Home screen the player will be presented with after logging in. The player will have the option to review their previously purchased tickets 360 or review any messages 361. The player can select to choose a lottery game to play 362. They player will also be able to add/withdraw funds 363 to their account and their current account balance will be displayed to them 364.

Figure 15:
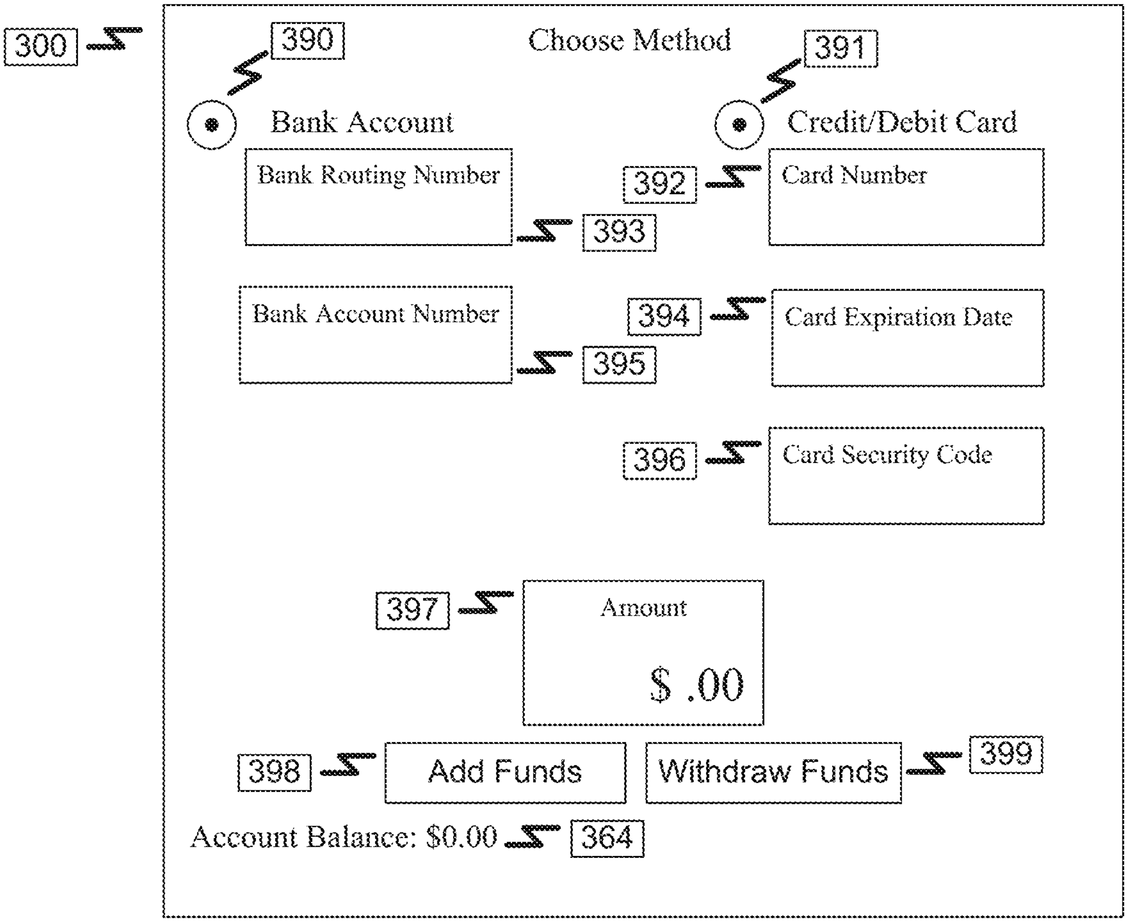
FIG. 15 is a diagram of the smart device application add funds screen.

FIG. 15 shows the Add Funds screen if the player selected to add/withdraw funds 363 to their account. The player will be given a choice of method as to how they would like to add funds to their account. The player can select to have funds withdrawn from their bank account 390. If the player selects this method, they will be required to enter their bank routing number 393 and bank account number 395. The player can also select to have the funds taken from their credit/debit card 391.

If the player selects that method, they will be required to enter their card number 392, card expiration date 394, and card security code 396. After selecting where the funds will come from, the player will enter the amount to add 397. After all the appropriate information has been entered, the player will use the add funds button 398 to submit the transaction. The players account balance will be displayed to them 364.

The player can remove the winnings or remaining funds that are in their playing account 364. The player will enter either their bank routing number 393 and bank account number 395 or the player will enter their credit/debit card number 392, card expiration date 394, and card security code 396. The player will then enter the amount of funds they would like to be transferred out of their account 397. Once the player has entered this information in, the player will then press the Withdraw Funds button 399 to finalize the transaction of removing funds from their playing account 364. Once the funds have been transferred out of their playing account 364, the player will receive a confirmation email detailing the transaction.

Figure 16:
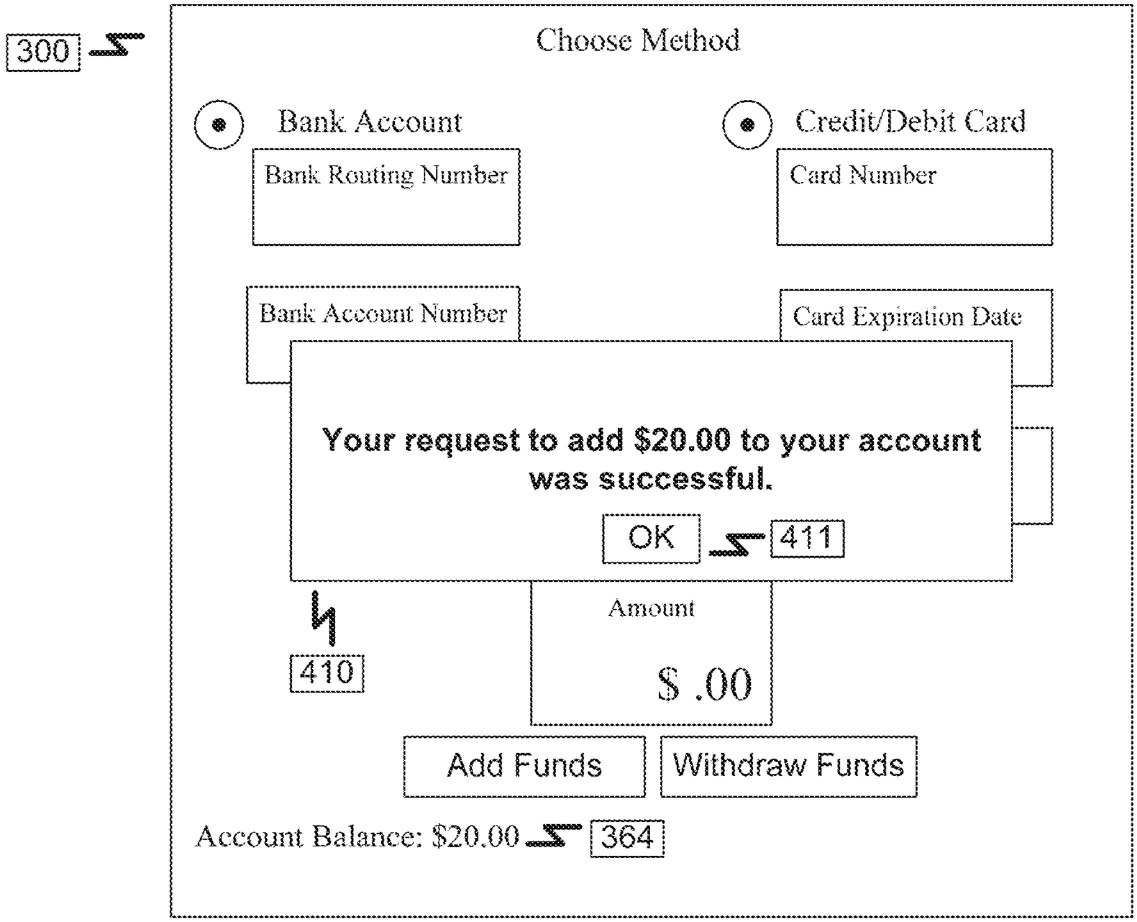
FIG. 16 is a diagram of the smart device application successful funds added screen.

FIG. 16 shows a Successful Funds Added screen. The application will display a message confirming the amount they added was successful 410 and their account balance 364 will reflect the funds added. The player will press the OK button 411 to navigate away from the message.

Figure 17:
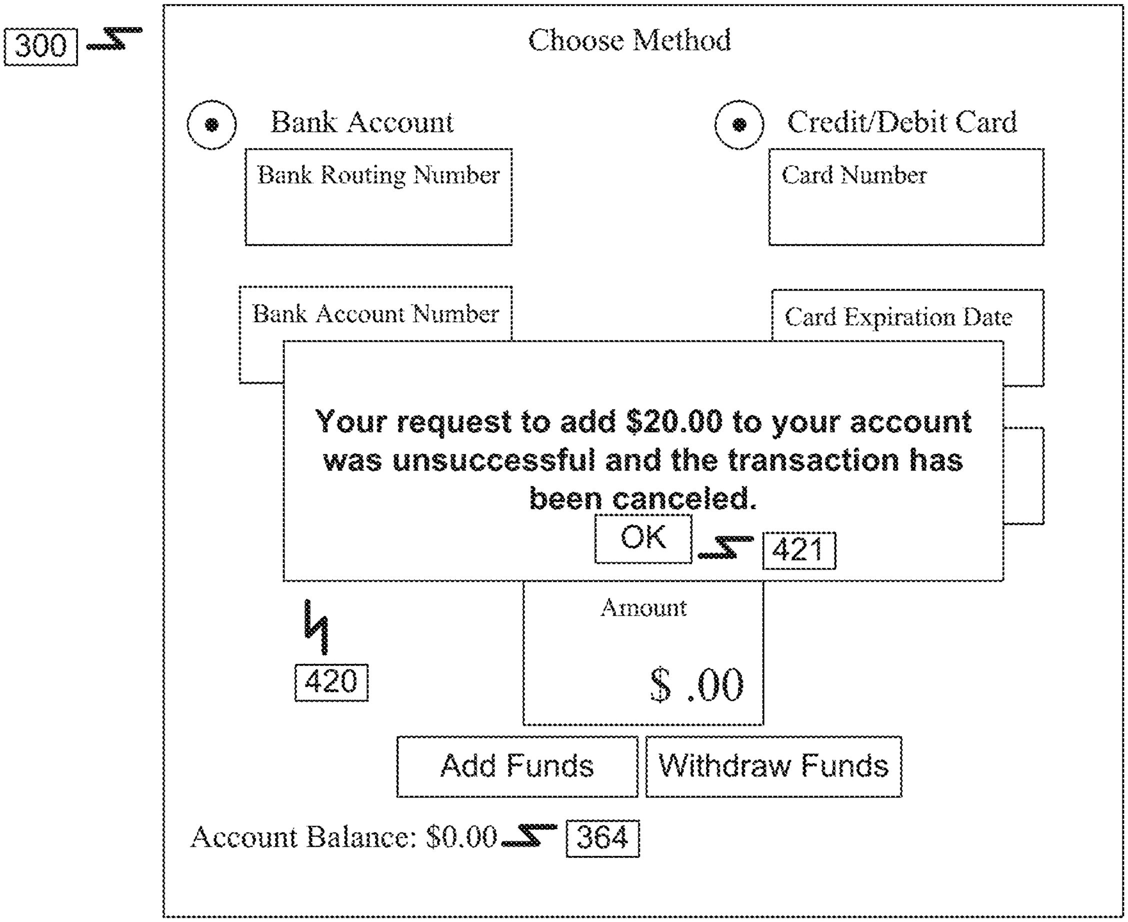
FIG. 17 is a diagram of the smart device application unsuccessful funds added screen.

FIG. 17 shows an Unsuccessful Funds Added screen. The application will display a message notifying the player that the transaction was unsuccessful 420. The player will press the OK button 421 to navigate away from the message.

Figure 18:
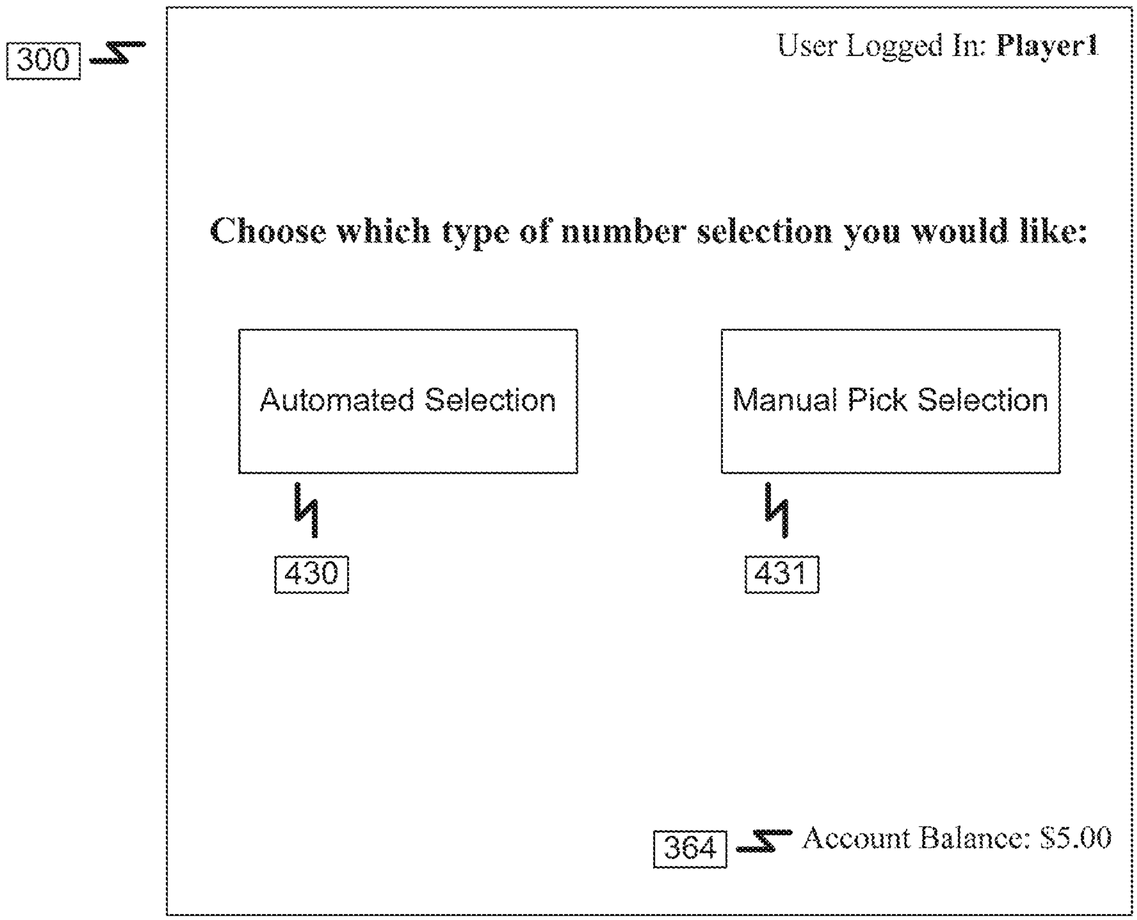
FIG. 18 is a diagram of the smart device application entry type selection screen.

FIG. 18 shows the Entry Type Selection screen. When the player selects to play a new game 362, they will be brought to this screen. The player will be given the choice to have their number selected for them by pressing automated selection 430 or they can pick their own numbers by pressing manual pick selection 431.

Figure 19:
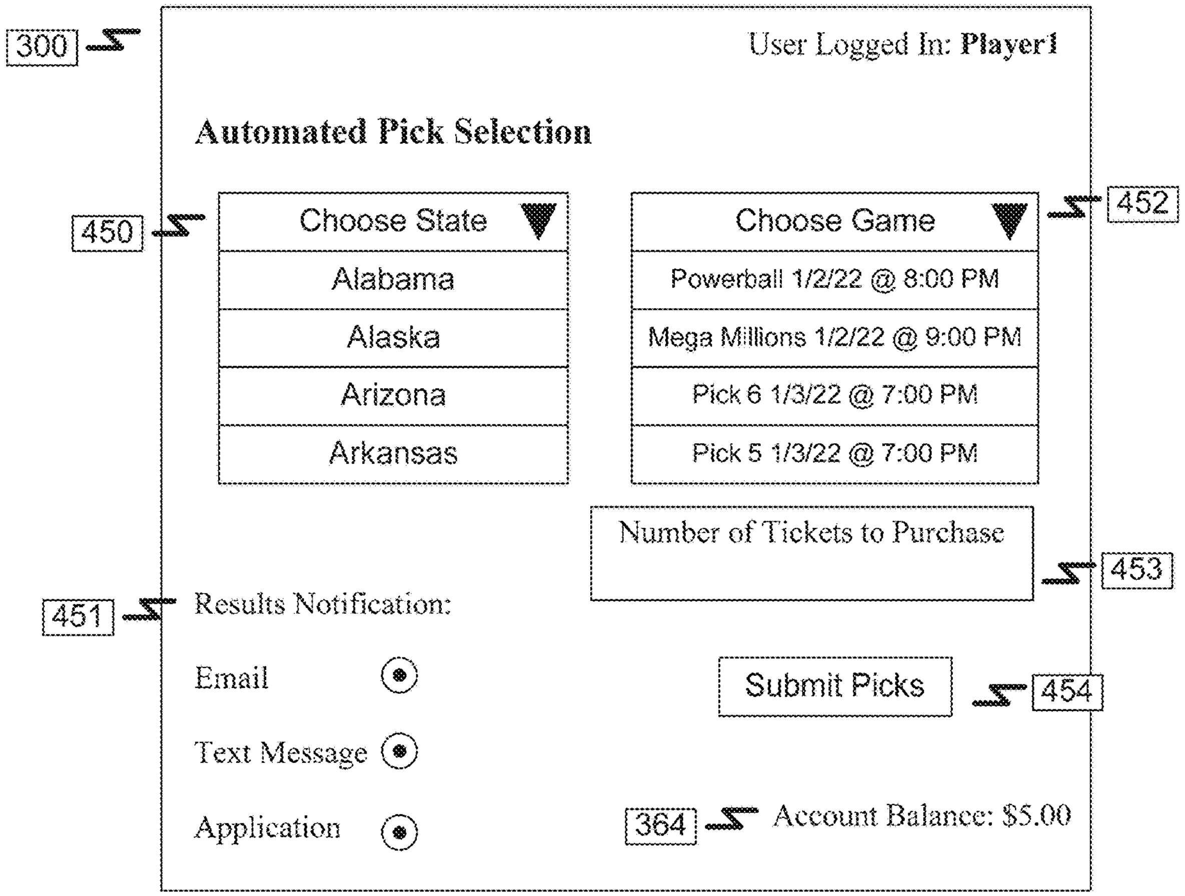
FIG. 19 is a diagram of the smart device automated pick screen.

FIG. 19 shows the Automated Pick screen. If the player decided to use Automated Selection 430, they will be brought to this screen. The player will be required to pick the state 450 of the drawing and the game 452 they would like to purchase. The player will then select the number of tickets to purchase 453. The player will need to select how they would like to receive their results notification 451. The player will have the option of selecting email, text message, or through the application. Once all the information has been entered the player will conclude their transaction by using the submit picks button 454.

Figure 20:
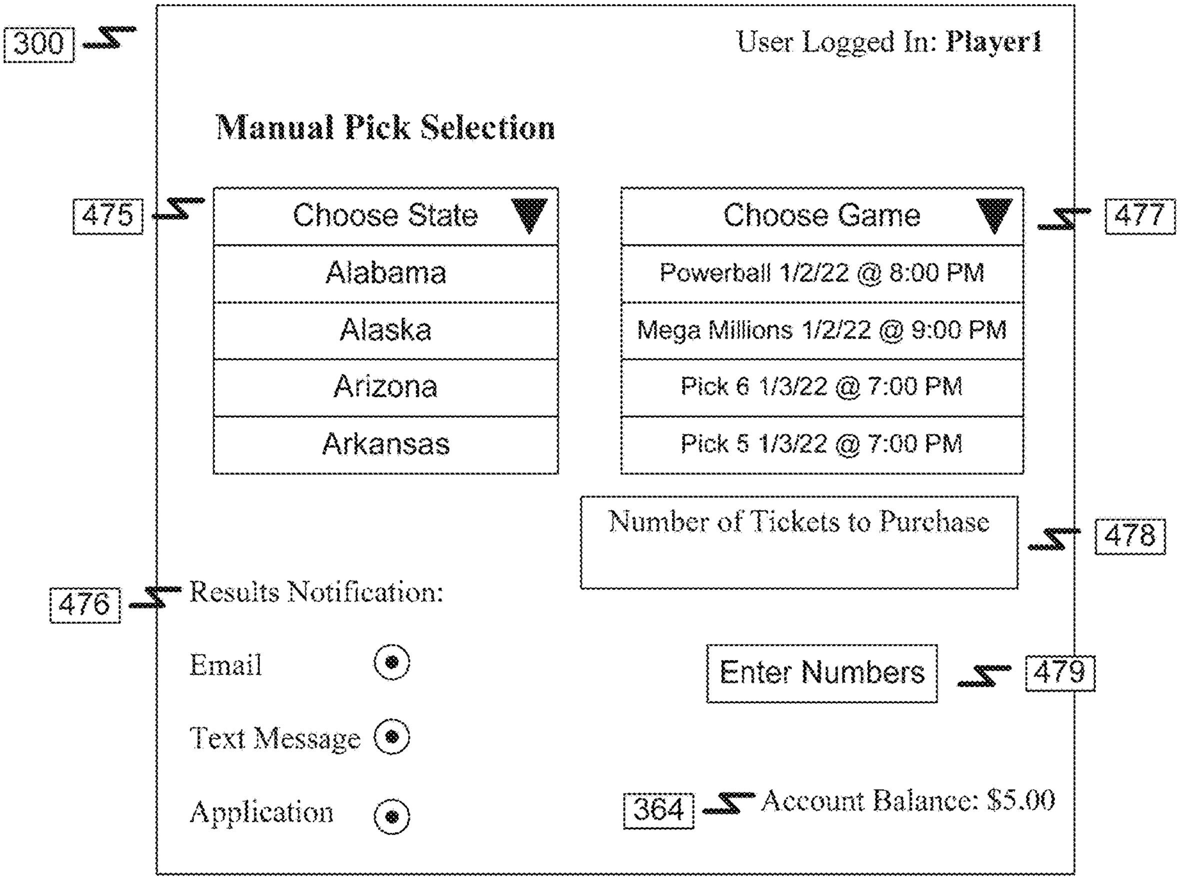
FIG. 20 is a diagram of the first smart device application manual pick selection screen.

FIG. 20 shows the first Manual Pick screen. If the player decided to use Manual Pick Selection 431, they will be brought to this screen. The player will be required to pick the state 475 of the drawing and the game 477 they would like to purchase. The player will then select the number of tickets to purchase 478. The player will need to select how they would like to receive their results notification 476. The player will have the option of selecting email, text message, or through the application. Once all the information has been entered the player will then be able to advance to the Pick Selection screen by hitting the enter numbers button 479.

Figure 21:
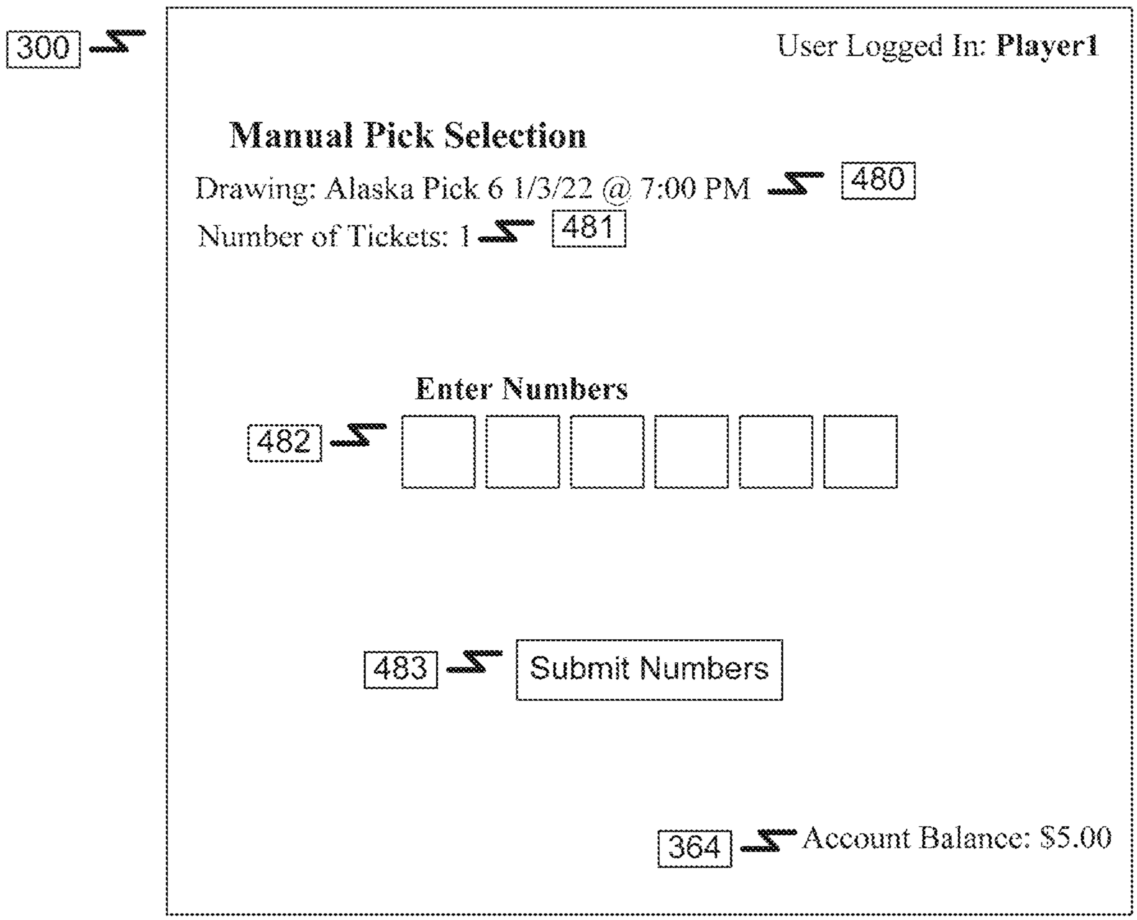
FIG. 21 is a diagram of the second smart device application manual pick selection screen.

FIG. 21 shows the second Manual Pick screen. The screen will display the drawing state, time, and game type 480 and the number of tickets 481 that they are purchasing. The player will enter their desired numbers under Enter Numbers 482. After the player has entered their numbers, they will hit Submit Numbers 483 to finalize the transaction.

Figure 22:
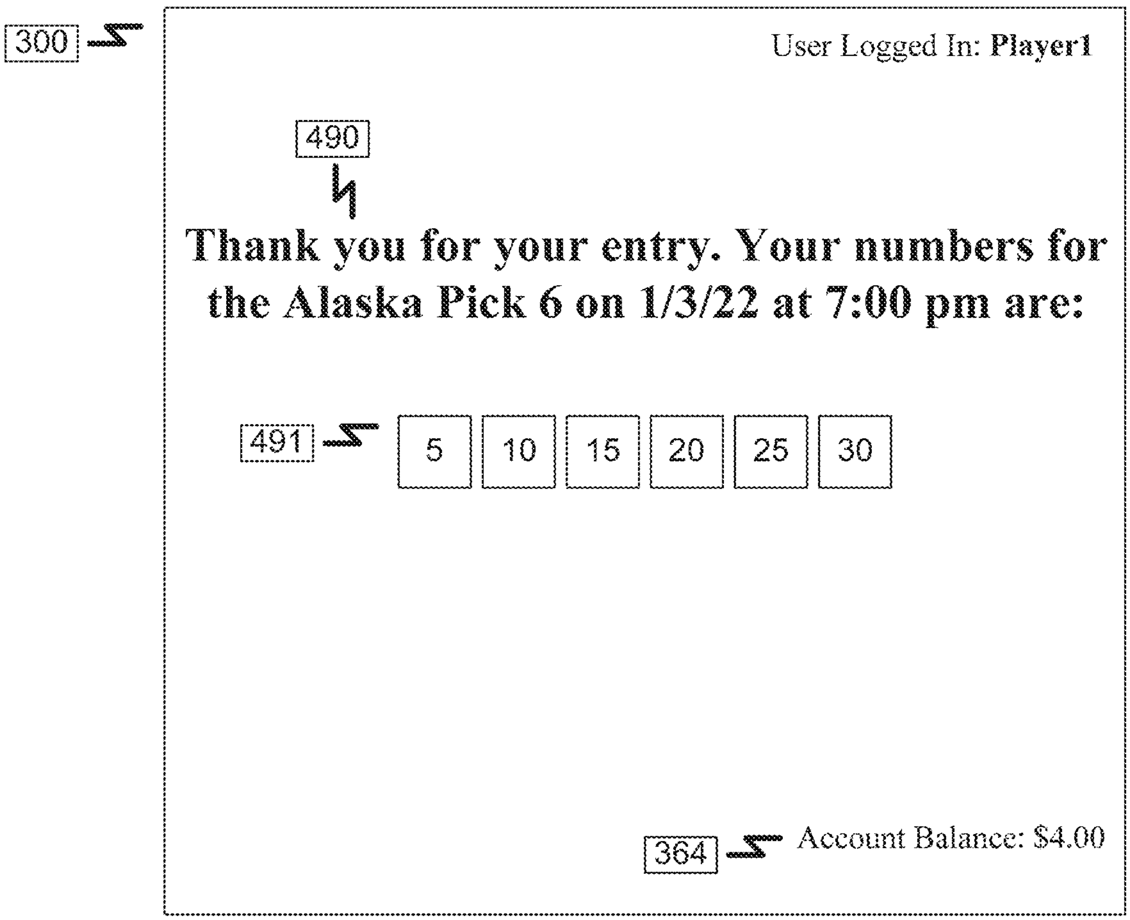
FIG. 22 is a diagram of the smart device application pick display screen.

FIG. 22 shows the Pick Display screen. The player will be displayed with a confirmation message 490 detailing the state, time, and game type of their pick. The player's entry numbers are also displayed 491.

Figure 23:
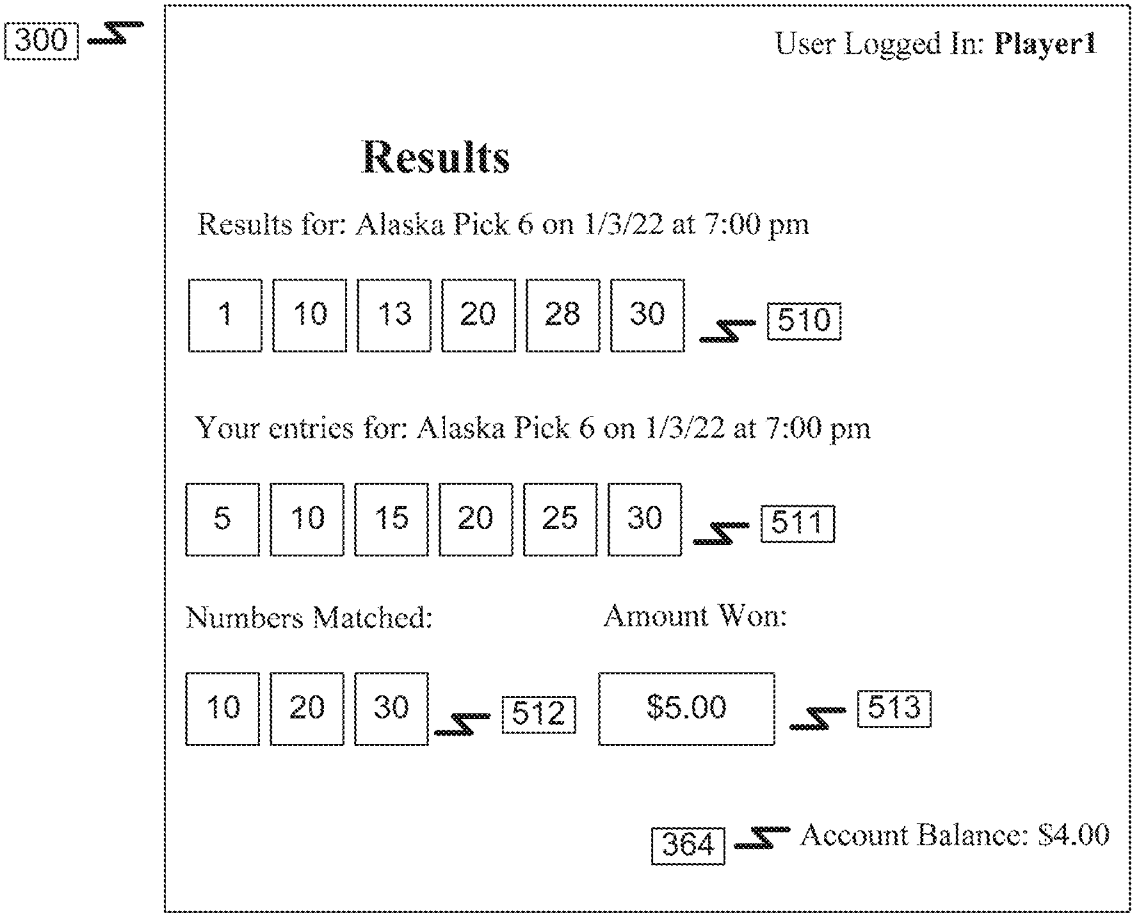
FIG. 23 is a diagram of the smart device application results display screen.

FIG. 23 shows the Results Display screen. The state, time, game type, and results 510 of the game entry will be displayed to the player. The player will also be displayed what their entry numbers were for the game. The screen will indicate what numbers the player matched to the drawing 512 and any amount won 513.

FIG. 24 is a prize cart for the lottery game Powerball. Powerball is a nonlimiting example of a public lottery that will exemplify the elements of the present invention.

Powerball is an American lottery game offered by 45 states, the District of Columbia, Puerto Rico and the U.S. Virgin Islands. It is coordinated by the Multi-State Lottery Association (MUSL). Each Powerball ticket presently costs $2. The lottery player picks five numbers from 1 to 69 and one Powerball number from 1 to 26. The Powerball jackpot is won by matching the five balls in any order, plus the one Powerball number (see FIG. 24).

A key objective of the present invention is to "machine select" one or more number group entry submissions on behalf of the lottery player. Each submission is referred to as a N-tuple number set. The N-tuple number sets are part of the complete group of combinations formed from the overall number set specified by the lottery rules. As such for the Powerball lottery, N becomes 6. Therefore, a 6-tuple number set becomes a submission number group for a lottery player participating in the Powerball lottery.

The method used in the present invention to produce N-tuple numbers incorporates the following elements: a unique number associated with the lottery player, an entropy source, a one way hash function, and a set of near prime numbers.

The lottery player's unique personal number can be, by a nonlimiting example, the lottery player's cell phone number, such as: (609) 921-9999, which is further converted into a single 10 decimal digit number: 6,099,219,999.

On any digital processor "platform", a free running timer function can be implemented. For the purposes of providing an entropy source, a millisecond timer with 3-digit resolution can be easily implemented. The timer is sampled (snapshot taken) when the lottery player makes a request for one or more N-tuple number groups. The snapshot, when randomly sampled becomes a random number value.

The SHA-256 algorithm is an example of a one-way hash function that produces a 256-bit result from a digital information block, and may be broken into eight 32-bit sub-elements. SHA-256 is a known message digest, and is a mathematical function that takes a variable-length input string and converts it into a fixed-length binary sequence that is computationally difficult to invert.

A finite length table of near prime numbers can be created from a smaller set of prime numbers. As seen in FIG. 24, there are 149 prime numbers existing from 71 to 1,000. These 149 prime numbers can be transformed into a much larger set of near prime numbers by selecting 3 of 149 combinations, where each combination is a subset of the original 149 prime numbers. A k-near prime (3-near prime) number is created by multiplication of the elements in each near prime subset. To calculate the number of 3-near primes produced using this method, the combination formula used is:

$$nCr = n!/(r!*(n-r)!) \text{ Or } {}_{149}C_3 = \frac{n!}{3!*(149-3)!} \text{ Or } {}_{149}C_3 = 540{,}284$$

It is desirable to shuffle the order of the 3-near prime numbers so N-tuple patterns do not appear to repeat. Shuffling can be achieved by using the well known Durstenfeld Shuffle algorithm. The Durstenfeld method requires many random numbers for each shuffle. For shuffling, the 3-near prime values requires the generation of 540,284 random numbers per shuffle. Ideally a natural entropy source could be used to produce "true" random numbers. Unfortunately, true random generators tend to be very slow, and are unlikely to be available if N-tuple number set are to be generated on a smart device. This limitation results in the use of a pseudo-random number generator for the Durstenfeld shuffle. For this nonlimiting example, the DRAND-48 random number generator is exemplified.

Pseudo-random number generators are well known to be problematic with respect to statistical behavior. DRAND-48 is not an exception. The DRAND-48 random number generator is of the category of a linear congruential method (LCM) of generating pseudo random numbers. The general formula for LCM is:

$$X\_((n+1))=(a*Xn+C)\mathrm{mod}(m)$$

For DRAND-48, the values are: $m=2^{48}$, a=5DEECE66D (hex), B=B (hex)

Thus: X_((n+1))=(5DEECE*Xn+B)mod (48)

To overcome the lack of randomness, the 6-bytes making up the DRAND-48 outcome can be logically exclusive-Ored (XORED) together to produce a single 8-bit (byte) value.

As with all pseudo-random number generators, a "seed" number must be used for Xn to start a random sequence. For the purposes of this example, the personal identifier (mobile cellular number) multiplied by the random timer value with a modulus of 2^48 will provide a starting seed value.

FIG. 25 shows a table of all the prime numbers in the range of 70 to 1,000 (inclusive).

Figure 26:
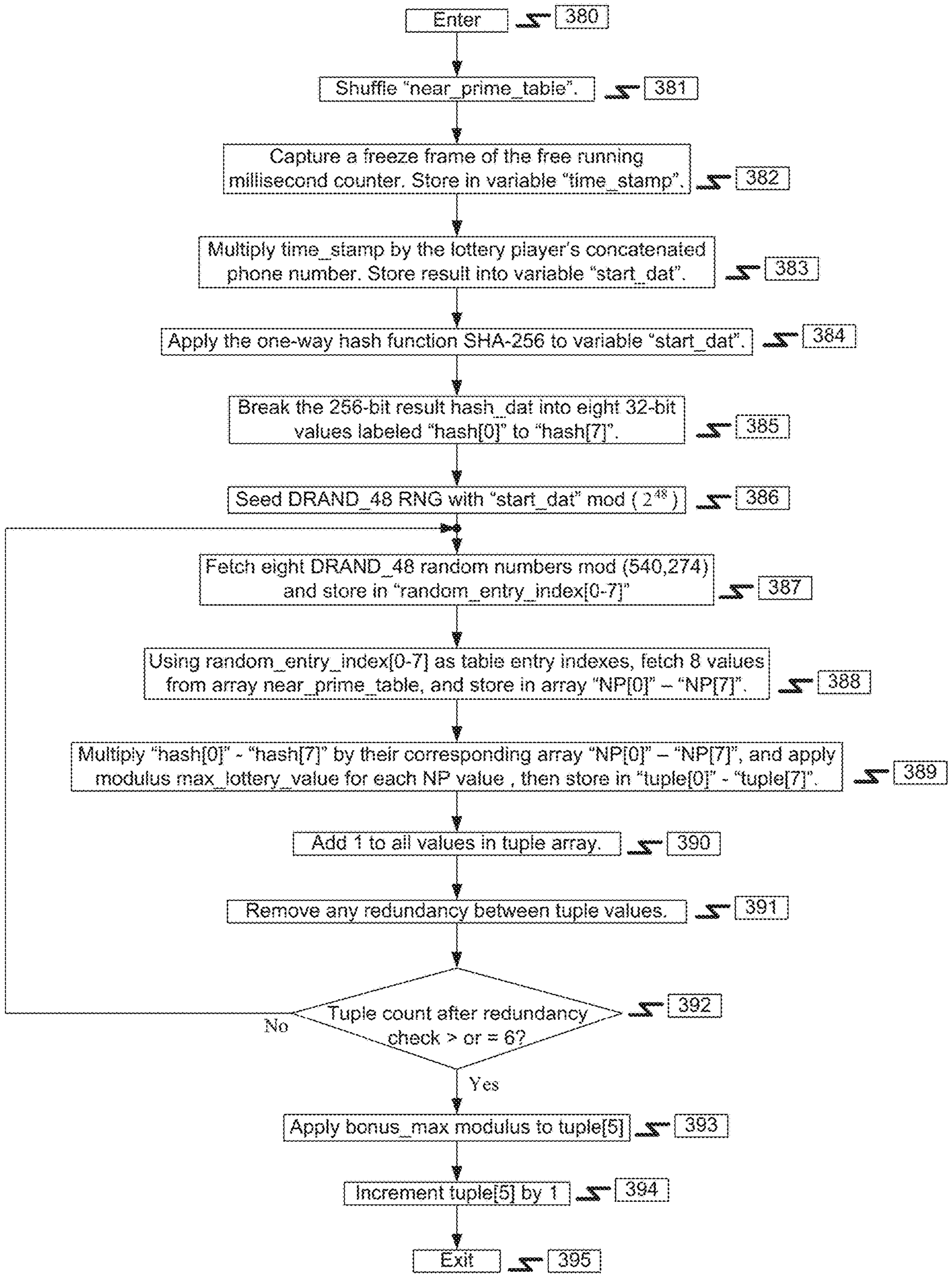
FIG. 26 is a flowchart for the N-tuple number set process.

FIG. 26 is a process flow chart for machine selecting 5 N-tuple number set numbers between 1 to 69, with an additional bonus number between 1 to 26. The N-tuple number set is implemented as a software function and may be incorporated into a smart device downloadable application or incorporated into the system software found within the system server 32. As a nonlimiting example, the public lottery Powerball will be an example.

Step 380 starts the N-tuple number set generation process. Step 381 shuffles the pre-populated array Near_Prime_Table. Step 382 fetches the Time_Stamp of the millisecond counter. The millisecond counter can be sampled with each iteration of the N-tuple number set process or sampled once when the lottery player executes their requests for N-tuple number set numbers. Step 383 produces a value for Start_Dat as a "seed value" (random) for the N-tuple number set number process. Step 384 produces a one-way hash value using the SHA-256 algorithm. The hash value is 256 bits in size (32-bytes). Step 385 partitions the 32-byte hash into eight 4-byte (32-bit) values. Step 386 "seeds" the well known pseudo random number generator with the value of Start_Dat. A modulus of $2^{48}$ is applied to the seed value. Step 387 fetches 8 numbers from the DRAND48 numbers generator and stores them in the array Random Entry Index. Each index has a modulus function applied to it when the modulus value is 540,274. The 540,274 value equal the number of entries in the near prime table. Step 388 uses the 8 ransom entry values to fetch from the near prime table 8 near prime values. Step 389 pairs each hash word with a near prim value. The two binary words are multiplied together to create 8 tuple values. Each tuple value has a modulus applied to it equal to the maximum lottery number value. Step 390 adjusts the resulting N-tuple number set numbers created in step 389 to a number value from 1 to Max Number inclusive. Step 391 analyzes the 8 tuple values for any number repetitions (redundancy). Duplicated numbers are "zeroed" out (except for the first instance). Step 392 checks to see if 6 numbers still remain after redundancy elimination in step 391. Therefore, if the remaining count of active array (tuple) elements is equal or greater than 6, the process proceeds to step 393. Otherwise, the process loops back to step 387. Step 393 applies a modulus function to tuple array element 5 to establish a bonus number value. Step 394 adjusts the bonus value to 1 to Bonus_Maximum inclusive. Step 395 exits the function (process).

As an alternative embodiment for selecting N-tuple number sets as exemplified in FIG. 26, the N-tuple combinations can be selected using an ordinal number method. As should be understood by someone skilled in the art, there is a one-to-one correspondence between nonrepeating ordinal numbers and an N-tuple subset. For the Powerball lottery, there are 11,238,513 combinations of 5 numbers, between 1-69 inclusive and selected 5 at a time. The number of combinations is increased to 292,201,338 when the 1-26 power ball values are added to the "mix".

There are two methods that can be used to randomly select an ordinal number. The first method is to use the hash values and a near prime number selection by multiplying them together and applying a modulus of 292,201,338 to the result. This calculation will identify the ordinal number for the 6-tuple number group.

The second method is to shuffle a table of ordinal numbers using the Durstenfeld shuffle algorithm previously described. The ordinal number selection will then become an index pointer for a table of all N-tuple combinations.

The first ordinal method should be used on a lottery player's smart device. The second ordinal method would best be implemented on the central system due to large table sizes. The central system would respond to requests from the lottery player's smart device.

Key advantages of the present invention that should be apparent to those skilled in the art are a lottery player does not have to go to a retail lottery outlet to buy one or more lottery tickets, nor are they required to go to a lottery outlet to verify (and claim) winnings. The present invention will tally any winnings for a lottery player, collect the winnings on behalf of the player, and put the winnings in the system's monetary account that was established during the lottery player's account initialization process. The present invention can also transfer winnings between the lottery player's system monetary account and to their personal bank account or a specified credit or debit card.

The invention claimed is:

1. A system for playing a lottery game, comprising:

a gravity pick or air mix mechanical machine game result generator configured to generate lottery result for the lottery game;

at least one server;

a plurality of authorized retailer lottery machines located at one or more authorized lottery retail establishments, wherein one or more machine generated lottery number combination entries for the lottery game are provided by at least one of the plurality of authorized retailer lottery machines;

a plurality of mobile devices located remotely from the at least one server and the plurality of authorized retailer lottery machines, and wherein a first mobile device of the plurality of mobile devices comprising at least one timer, and is configured to:

download from the at least one server a lottery game application for a first lottery game player;

generate, by the downloaded application on the first mobile device, one or more randomized N-tuple number groups associated with the first mobile device for a selection by the first lottery game player, wherein the one or more randomized N-tuple number groups representing one or more machine generated lottery number combination entries for the lottery game; and wherein the N-tuple number groups associated with the first mobile device are randomized by using a multiplication of a version of a unique personal identification number associated with the first mobile device and a time sample from the at least one timer of the first mobile device as a starting seed; and a second mobile device of the plurality of mobile devices comprising at least one timer, and is configured to:

download from the at least one server the same lottery game application for a second lottery game player;

generate, by the downloaded application on the second mobile device, one or more randomized N-tuple number groups associated with the second mobile device for a selection by the second lottery game player, wherein the one or more randomized N-tuple number groups representing one or more machine generated lottery number combination entries for the lottery game;

wherein the N-tuple number groups associated with the second mobile device are randomized by using a multiplication of a version of a unique personal identification number associated with the second mobile device and a time sample from the at least one timer of the second mobile device as a starting seed; and wherein at least the first mobile device is configured to submit selected one or more generated randomized N-tuple number groups to the at least one server, and to receive from the at least one server the generated lottery result generated by the gravity pick or air mix mechanical machine game result generator, and is further configured to indicate whether the submitted selected one or more generated randomized N-tuple number groups match the received generated lottery result generated by the gravity pick or air mix mechanical machine game result generator.

* * * * *